(12) United States Patent
Hagadorn et al.

(10) Patent No.: US 9,102,773 B2
(45) Date of Patent: Aug. 11, 2015

(54) PROCESS FOR CONTROLLING MOLECULAR WEIGHT OF POLYOLEFINS PREPARED USING PYRIDYL DIAMIDE CATALYST SYSTEMS

(71) Applicant: ExxonMobil Chemical Patents Inc., Baytown, TX (US)

(72) Inventors: John R. Hagadorn, Houston, TX (US); Matthew S. Bedoya, Humble, TX (US); Peijun Jiang, League City, TX (US)

(73) Assignee: ExxonMobil Chemical Patents Inc., Baytown, TX (US)

( * ) Notice: Subject to any disclaimer, the term of this patent is extended or adjusted under 35 U.S.C. 154(b) by 0 days.

(21) Appl. No.: 14/159,029

(22) Filed: Jan. 20, 2014

(65) Prior Publication Data

US 2014/0221587 A1  Aug. 7, 2014

Related U.S. Application Data

(60) Provisional application No. 61/761,307, filed on Feb. 6, 2013.

(51) Int. Cl.
| | |
|---|---|
| C08F 4/52 | (2006.01) |
| C08F 4/76 | (2006.01) |
| C08F 4/64 | (2006.01) |
| C08F 210/06 | (2006.01) |
| C08F 4/60 | (2006.01) |

(52) U.S. Cl.
CPC ............... *C08F 210/06* (2013.01); *C08F 4/52* (2013.01); *C08F 4/60148* (2013.01)

(58) Field of Classification Search
CPC ............... C08F 4/60148; C08F 4/52
USPC .................................................. 526/172, 161
See application file for complete search history.

(56) References Cited

U.S. PATENT DOCUMENTS

| | | | |
|---|---|---|---|
| 6,103,657 | A | 8/2000 | Murray et al. |
| 6,175,409 | B1 | 1/2001 | Nielsen et al. |
| 6,194,527 | B1 | 2/2001 | Cribbs |
| 6,260,407 | B1 | 7/2001 | Petro et al. |
| 6,294,388 | B1 | 9/2001 | Petro et al. |
| 6,306,658 | B1 | 10/2001 | Turner et al. |
| 6,406,632 | B1 | 6/2002 | Safir et al. |
| 6,436,292 | B1 | 8/2002 | Petro et al. |
| 6,454,947 | B1 | 9/2002 | Safir et al. |
| 6,455,316 | B1 | 9/2002 | Turner et al. |
| 6,461,515 | B1 | 10/2002 | Safir et al. |

(Continued)

FOREIGN PATENT DOCUMENTS

| | | |
|---|---|---|
| WO | 95/07941 | 3/1995 |
| WO | 00/09255 | 2/2000 |

(Continued)

OTHER PUBLICATIONS

Boussie, Thomas R., et al, "A Fully Integrated High-Throughput Screening Methodology for the Discovery of New Polyolefin Catalysts: Discovery of a New Class of High Temperature Single-Site Group (IV) Copolymerization Catalysts", J. Am. Chem. Soc., 2003, 125, pp. 4306-4317.

(Continued)

*Primary Examiner* — Rip A Lee

(57) ABSTRACT

Pyridyldiamido transition metal complexes are disclosed for use in alkene polymerization to produce polyolefins.

43 Claims, 2 Drawing Sheets

(56) References Cited

U.S. PATENT DOCUMENTS

| | | |
|---|---|---|
| 6,475,391 B2 | 11/2002 | Safir et al. |
| 6,489,168 B1 | 12/2002 | Wang et al. |
| 6,491,816 B2 | 12/2002 | Petro et al. |
| 6,491,823 B1 | 12/2002 | Safir et al. |
| 6,900,321 B2 | 5/2005 | Boussie et al. |
| 6,953,764 B2 | 10/2005 | Frazier et al. |
| 7,847,042 B2 * | 12/2010 | Miserque et al. ............. 526/185 |
| 7,973,116 B2 * | 7/2011 | Hagadorn et al. ............ 526/172 |
| 8,394,902 B2 | 3/2013 | Hagadorn et al. |
| 2002/0142912 A1 | 10/2002 | Boussie et al. |
| 2004/0220050 A1 | 11/2004 | Frazier et al. |
| 2010/0022726 A1 | 1/2010 | Hagadorn et al. |
| 2011/0224391 A1 | 9/2011 | Hagadorn et al. |
| 2011/0301310 A1 | 12/2011 | Hagadorn et al. |
| 2012/0071616 A1 | 3/2012 | Hagadorn et al. |

FOREIGN PATENT DOCUMENTS

| | | |
|---|---|---|
| WO | 2005/095469 | 10/2005 |
| WO | 2007/067965 | 6/2007 |
| WO | 2010/037059 | 4/2010 |

OTHER PUBLICATIONS

Froese, Robert D. J., et al., "Mechanism of Activation of a Hafnium Pyridyl-Amide Olefin Polymerization Catalyst: Ligand Modification by Monomer", J. Am. Chem. Soc., 2007, 129, pp. 7831-7840.
U.S. Appl. No. 13/071,738, filed Mar. 25, 2011, Hagadorn, et al.
U.S. Appl. No. 13/114,307, filed May 24, 2011, Hagadorn, et al.
U.S. Appl. No. 13/207,847, filed Aug. 11, 2011, Hagadorn, et al.

* cited by examiner

PROCESS FOR CONTROLLING MOLECULAR WEIGHT OF POLYOLEFINS PREPARED USING PYRIDYL DIAMIDE CATALYST SYSTEMS

PRIORITY CLAIM

This application claims priority to and the benefit of U.S. Provisional Application No. 61/761,307, filed Feb. 6, 2013.

FIELD OF INVENTION

The invention relates to pyridyldiamido transition metal complexes and intermediates and processes for use in making such pyridyldiamido complexes. The transition metal complexes may be used as catalysts for alkene polymerization processes.

BACKGROUND OF INVENTION

Pyridyl amines have been used to prepare Group 4 complexes which are useful transition metal components in the polymerization of alkenes, see for example US 2002/0142912, U.S. Pat. No. 6,900,321, and U.S. Pat. No. 6,103,657, where the ligands have been used in complexes in which the ligands are coordinated in a bidentate fashion to the transition metal atom.

WO 2005/095469 shows catalyst compounds that use tridentate ligands through two nitrogen atoms (one amido and one pyridyl) and one oxygen atom.

US 2004/0220050A1 and WO 2007/067965 disclose complexes in which the ligand is coordinated in a tridentate fashion through two nitrogen (one amido and one pyridyl) and one carbon (aryl anion) donors.

A key step in the activation of these complexes is the insertion of an alkene into the metal-aryl bond of the catalyst precursor (Froese, R. D. J. et al., J. Am. Chem. Soc. 2007, 129, pp. 7831-7840) to form an active catalyst that has both a five-membered and a seven-membered chelate ring.

WO 2010/037059 discloses pyridine containing amines for use in pharmaceutical applications.

U.S. Pat. No. 7,973,116, U.S. Ser. No. 13/071,738, filed Mar. 25, 2011 (now allowed); U.S. Ser. No. 13/114,307, filed May 24, 2011, and U.S. Ser. No. 13/207,847, filed Aug. 11, 2011, which are incorporated by reference herein, disclose pyridyldiamido transition metal complexes as polymerization catalysts.

There still is need for adding synthetic routes to widen the range of catalysts complexes that may be prepared and broaden their performance in alkene polymerization. The performance may be varied with respect to the amount of polymer produced per amount of catalyst (generally referred to as the "activity") under the prevailing polymerization conditions; the molecular weight and molecular weight distribution achieved at a given temperature; and the placement of higher alpha-olefins in terms of the degree of stereoregular placement.

SUMMARY OF INVENTION

This invention relates to pyridyldiamido and related transition metal complexes represented by the formula (I), or (II)

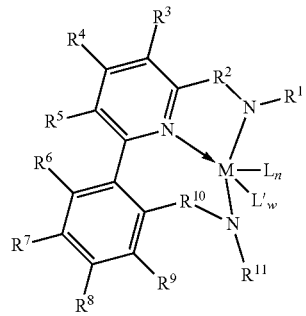

(I)

or

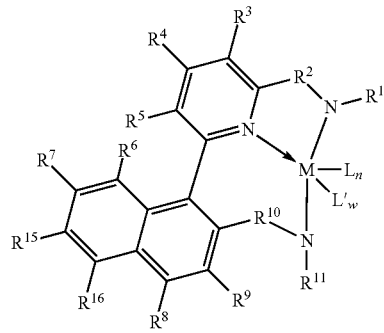

(II)

wherein:

M is a Group 3, 4, 5, 6, 7, 8, 9, 10, 11, or 12 metal;

$R^1$ is selected from the group consisting of hydrocarbyls, substituted hydrocarbyls, and silyl groups (preferably a phenyl group substituted at the 2 and 6 positions, preferably with the same or different C1-C20 alkyl groups);

$R^{11}$ is selected from the group consisting of hydrocarbyls substituted, hydrocarbyls, and silyl groups, preferably $R^{11}$ is a phenyl group substituted at the 2 position, preferably with a C1-C20 alkyl group and which is not substituted at the 3, 5, and/or 6 positions, optionally, the 4 position can be substituted with a group 17 element or a C1-C20 alkyl group;

$R^2$ and $R^{10}$ are each, independently, $-E(R^{12})(R^{13})-$ with E being carbon, silicon, or germanium, and each $R^{12}$ and $R^{13}$ being independently selected from the group consisting of hydrogen, hydrocarbyls, and substituted hydrocarbyls, alkoxy, silyl, amino, aryloxy, halogen, and phosphino, $R^{12}$ and $R^{13}$ may be joined to form a saturated, substituted or unsubstituted hydrocarbyl ring, where the ring has 4, 5, 6, or 7 ring carbon atoms and where substitutions on the ring can join to form additional rings, or $R^{12}$ and $R^{13}$ may be joined to form a saturated heterocyclic ring, or a saturated substituted heterocyclic ring where substitutions on the ring can join to form additional rings;

$R^3$, $R^4$, and $R^5$ are independently selected from the group consisting of hydrogen, hydrocarbyls, substituted hydrocarbyls, alkoxy, aryloxy, halogen, amino, and silyl, and wherein adjacent R groups ($R^3$ & $R^4$ and/or $R^4$ & $R^5$) may be joined to form a substituted or unsubstituted hydrocarbyl or heterocyclic ring, where the ring has 5, 6, 7, or 8 ring atoms and where substitutions on the ring can join to form additional rings;

$R^6$, $R^7$, $R^8$, $R^9$, $R^{15}$, and $R^{16}$ are independently selected from the group consisting of hydrogen, hydrocarbyls, substituted hydrocarbyls, alkoxy, halogen, amino, and silyl, and wherein adjacent R groups ($R^6$ & $R^7$, and/or $R^7$ & $R^{15}$, and/or $R^{16}$ & $R^{15}$, and/or $R^8$ & $R^9$) may be joined to form a saturated, substituted or unsubstituted hydrocarbyl or heterocyclic ring, where the ring has 5, 6, 7, or 8 ring carbon atoms and where substitutions on the ring can join to form additional rings;

L is an anionic leaving group, wherein the L groups may be the same or different and any two L groups may be linked to form a dianionic leaving group;

n is 0, 1, 2, 3, or 4;

L' is neutral Lewis base;

w is 0, 1, 2, 3, or 4; and wherein n+w is no greater than 4.

This invention further relates to process to make the above complex, process to make intermediates for the above complex and methods to polymerize olefins using the above complex.

DETAILED DESCRIPTION

Figure 1:
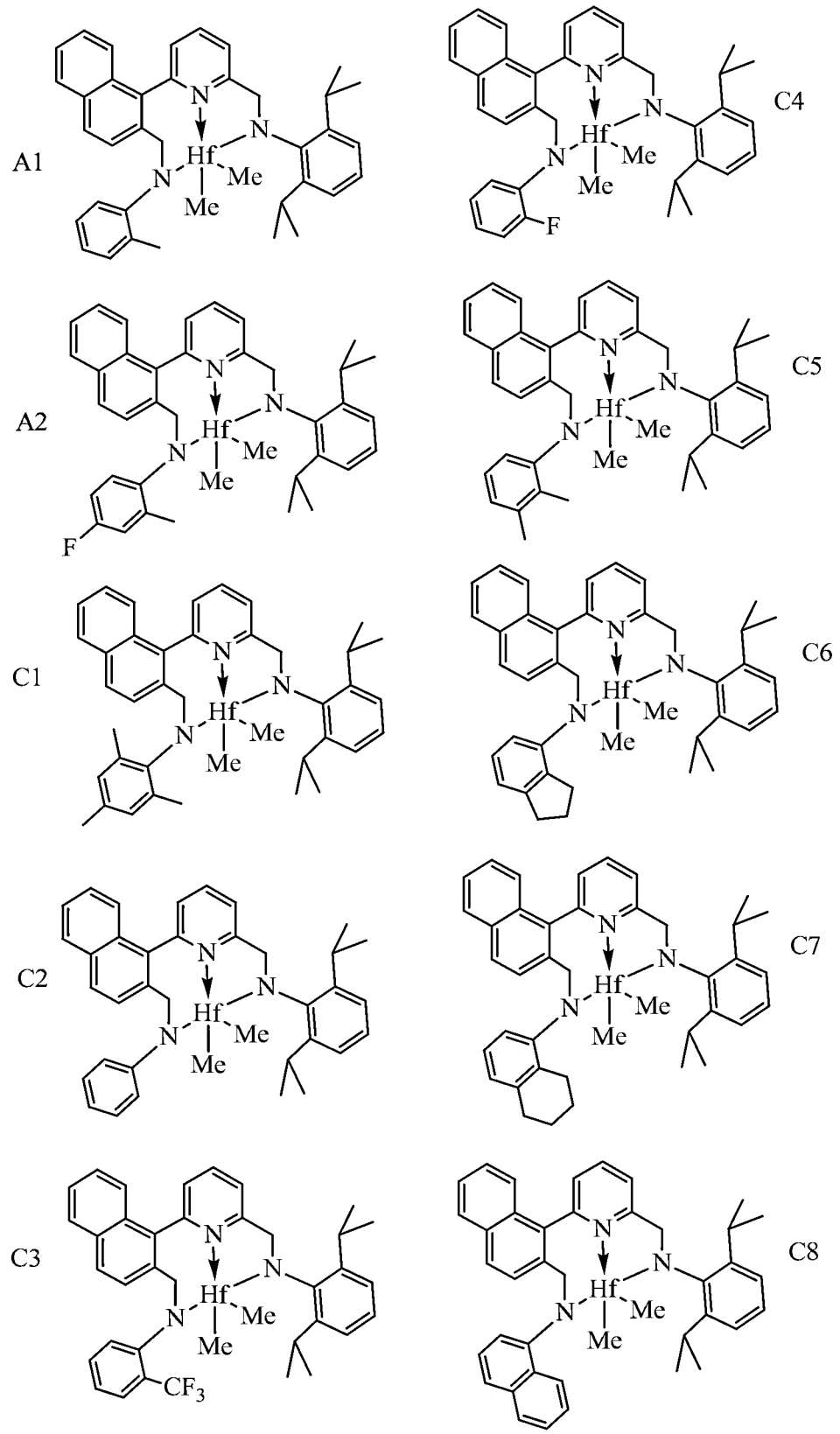
FIG. 1 provides some of the formulae for pyridyldiamido transition metal catalyst described herein.

The specification describes transition metal complexes. The term complex is used to describe molecules in which an ancillary ligand is coordinated to a central transition metal atom. The ligand is bulky and stably bonded to the transition metal so as to maintain its influence during use of the catalyst, such as polymerization. The ligand may be coordinated to the transition metal by covalent bond and/or electron donation coordination or intermediate bonds. The transition metal complexes are generally subjected to activation to perform their polymerization function using an activator which is believed to create a cation as a result of the removal of an anionic group, often referred to as a leaving group, from the transition metal.

As used herein, the numbering scheme for the Periodic Table groups is the new notation as set out in Chemical and Engineering News, 63(5), p. 27 (1985).

As used herein, Me is methyl, Et is ethyl, Bu is butyl, t-Bu and $^t$Bu are tertiary butyl, Pr is propyl, iPr and $^i$Pr are isopropyl, Cy is cyclohexyl, THF (also referred to as thf) is tetrahydrofuran, Bn is benzyl, and Ph is phenyl.

The term "substituted" generally means that a hydrogen of the substituted species has been replaced with a different atom or group of atoms. For example, methyl-cyclopentadiene is cyclopentadiene that has been substituted with a methyl group. Likewise, picric acid can be described as phenol that has been substituted with three nitro groups, or, alternatively, as benzene that has been substituted with one hydroxyl and three nitro groups.

The terms "hydrocarbyl radical," "hydrocarbyl," and "hydrocarbyl group" are used interchangeably throughout this document. Likewise, the terms "group," "radical," and "substituent" are also used interchangeably in this document. For purposes of this disclosure, "hydrocarbyl radical" is defined to be C$_1$-C$_{100}$ radicals, that may be linear, branched, or cyclic, and when cyclic, aromatic or non-aromatic.

A substituted hydrocarbyl radical is a hydrocarbyl radical in which at least one hydrogen atom of the hydrocarbyl radical has been substituted with at least one functional group such as NR*$_2$, OR*, SeR*, TeR*, PR*$_2$, AsR*$_2$, SbR*$_2$, SR*, BR*$_2$, SiR*$_3$, GeR*$_3$, SnR*$_3$, PbR*$_3$, and the like, or where at least one heteroatom has been inserted within a hydrocarbyl ring, where R* is, independently, hydrogen or a hydrocarbyl radical, or any combination thereof The term "catalyst system" is defined to mean a complex/activator pair. When "catalyst system" is used to describe such a pair before activation, it means the unactivated catalyst complex (precatalyst) together with an activator and, optionally, a co-activator. When it is used to describe such a pair after activation, it means the activated complex and the activator or other charge-balancing moiety. The transition metal compound may be neutral as in a precatalyst, or a charged species with a counter ion as in an activated catalyst system.

Complex, as used herein, is also often referred to as catalyst precursor, precatalyst, catalyst, catalyst compound, transition metal compound, or transition metal complex. These words are used interchangeably. Activator and cocatalyst are also used interchangeably.

A scavenger is a compound that is typically added to facilitate polymerization by scavenging impurities. Some scavengers may also act as activators and may be referred to as co-activators. A co-activator, that is not a scavenger, may also be used in conjunction with an activator in order to form an active catalyst. In some embodiments, a co-activator can be pre-mixed with the transition metal compound to form an alkylated transition metal compound.

Noncoordinating anion (NCA) is defined to mean an anion either that does not coordinate to the catalyst metal cation or that does coordinate to the metal cation, but only weakly. The term NCA is also defined to include multicomponent NCA-containing activators, such as N,N-dimethylanilinium tetrakis(pentafluorophenyl)borate, that contain an acidic cationic group and the non-coordinating anion. The term NCA is also defined to include neutral Lewis acids, such as tris(pentafluorophenyl)boron, that can react with a catalyst to form an activated species by abstraction of an anionic group. An NCA coordinates weakly enough that a neutral Lewis base, such as an olefinically or acetylenically unsaturated monomer can displace it from the catalyst center. Any metal or metalloid that can form a compatible, weakly coordinating complex may be used or contained in the noncoordinating anion. Suitable metals include, but are not limited to, aluminum, gold, and platinum. Suitable metalloids include, but are not limited to, boron, aluminum, phosphorus, and silicon. A stoichiometric activator can be either neutral or ionic. The terms ionic activator and stoichiometric ionic activator can be used interchangeably. Likewise, the terms neutral stoichiometric activator, and Lewis acid activator can be used interchangeably. The term non-coordinating anion includes neutral stoichiometric activators, ionic stoichiometric activators, ionic activators, and Lewis acid activators.

An "olefin," alternatively referred to as "alkene," is a linear, branched, or cyclic compound of carbon and hydrogen having at least one double bond. For purposes of this specification and the claims appended thereto, when a polymer or copolymer is referred to as comprising an olefin, including, but not limited to, ethylene, propylene, and butene, the olefin present in such polymer or copolymer is the polymerized form of the olefin. For example, when a copolymer is said to have an "ethylene" content of 35 wt % to 55 wt %, it is understood that the mer unit in the copolymer is derived from ethylene in the polymerization reaction and said derived units are present at 35 wt % to 55 wt %, based upon the weight of the copolymer. A "polymer" has two or more of the same or different mer units. A "homopolymer" is a polymer having mer units that are the same. A "copolymer" is a polymer having two or more mer units that are different from each other. A "terpolymer" is a polymer having three mer units that are different from each other. "Different" as used to refer to mer units indicates that the mer units differ from each other by at least one atom or are different isomerically. Accordingly, the definition of copolymer, as used herein, includes terpolymers and the like. An oligomer is a polymer having a low molecular weight. In some embodiments, an oligomer has an Mn of 21,000 g/mol or less (e.g., 2,500 g/mol or less); in other embodiments, an oligomer has a low number of mer units (such as 50 mer units or less).

An "alpha-olefin" is an olefin having a double bond at the alpha (or 1-) position. A higher α-olefin is defined to be an α-olefin having 4 or more carbon atoms.

Unless otherwise noted, all molecular weights units (e.g., Mw, Mn, Mz) are g/mol.

Unless otherwise noted all melting points ($T_m$) are DSC second melt.

A "ring carbon atom" is a carbon atom that is part of a cyclic ring structure. By this definition, a benzyl group has six ring carbon atoms and para-methylstyrene also has six ring carbon atoms.

The term "aryl" or "aryl group" means a six carbon aromatic ring and the substituted variants thereof, including but not limited to, phenyl, 2-methyl-phenyl, xylyl, 4-bromo-xylyl. Likewise, heteroaryl means an aryl group where a ring carbon atom (or two or three ring carbon atoms) has been replaced with a heteroatom, preferably N, O, or S.

The term "ring atom" means an atom that is part of a cyclic ring structure. By this definition, a benzyl group has six ring atoms and tetrahydrofuran has 5 ring atoms.

A heterocyclic ring is a ring having a heteroatom in the ring structure as opposed to a heteroatom substituted ring where a hydrogen on a ring atom is replaced with a heteroatom. For example, tetrahydrofuran is a heterocyclic ring and 4-N,N-dimethylamino-phenyl is a heteroatom substituted ring.

As used herein the term "aromatic" also refers to pseudoaromatic heterocycles which are heterocyclic substituents that have similar properties and structures (nearly planar) to aromatic heterocyclic ligands, but are not by definition aromatic; likewise, the term aromatic also refers to substituted aromatics.

The term "continuous" means a system that operates without interruption or cessation. For example, a continuous process to produce a polymer would be one where the reactants are continually introduced into one or more reactors and polymer product is continually withdrawn.

A solution polymerization means a polymerization process in which the polymer is dissolved in a liquid polymerization medium, such as an inert solvent or monomer(s) or their blends. A solution polymerization is typically homogeneous. A homogeneous polymerization is one where the polymer product is dissolved in the polymerization medium. Such systems are preferably not turbid as described in J. Vladimir Oliveira, C. Dariva and J. C. Pinto, Ind. Eng. Chem. Res. 29, 2000, p. 4627.

A bulk polymerization means a polymerization process in which the monomers and/or comonomers being polymerized are used as a solvent or diluent using little or no inert solvent as a solvent or diluent. A small faction of inert solvent might be used as a carrier for catalyst and scavenger. A bulk polymerization system typically contains less than 25 wt % of inert solvent or diluent, preferably less than 10 wt %, preferably less than 1 wt %, preferably 0 wt %.

The term "multimodal," when used to describe a polymer or polymer composition, means "multimodal molecular weight distribution," which is understood to mean that the Gel Permeation Chromatography (GPC) trace, plotted as Absorbance versus Retention Time (seconds), has more than one peak or inflection point(s). An "inflection point" is that point where the second derivative of the curve changes in sign (e.g., from negative to positive or vice versa). For example, a polyolefin composition that includes a first lower molecular weight polymer component (such as a polymer having an Mw of 100,000 g/mol) and a second higher molecular weight polymer component (such as a polymer having an Mw of 300,000 g/mol) is considered to be a "bimodal" polyolefin composition. Preferably the Mw's of the polymer or polymer composition differ by at least 10%, relative to each other, preferably by at least 20%, preferably at least 50%, preferably by at least 100%, preferably by at least 200%. Likewise, in a preferred embodiment, the Mw's of the polymer or polymer composition differ by 10% to 10,000%, relative to each other, preferably by 20% to 1000%, preferably 50% to 500%, preferably by at least 100% to 400%, preferably 200% to 300%.

"Catalyst activity" is a measure of how many grams of polymer (P) are produced using a polymerization catalyst comprising W mmol of transition metal (M), over a period of time of T hours; and may be expressed by the following formula: P/(T×W).

In a first aspect of the invention there is provided a pyridyl-diamido transition metal complex (optionally for use in alkene polymerization) represented by the formula

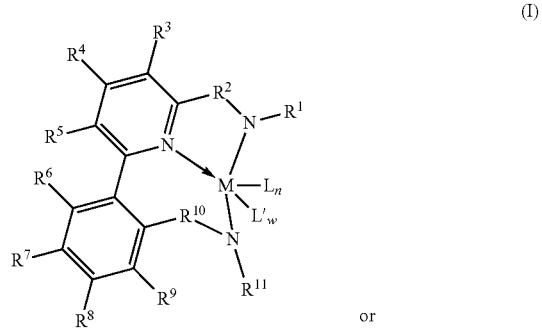

(I)

or

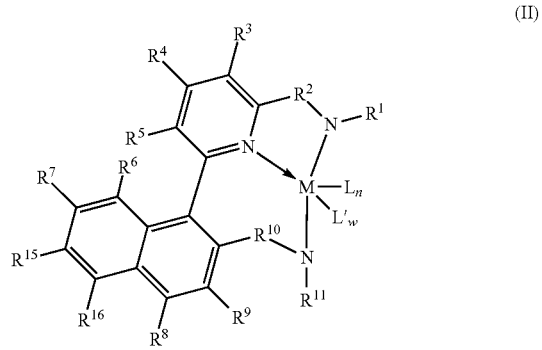

(II)

wherein:
M is a Group 3, 4, 5, 6, 7, 8, 9, 10, 11, or 12 metal;
$R^1$ and $R^{11}$ are each independently selected from the group consisting of hydrocarbyls substituted hydrocarbyls, and silyl groups (preferably a phenyl group substituted at the 2 and 6 positions, preferably with the same or different C1-C20 alkyl groups), more preferably $R^{11}$ is a phenyl group substituted at the 2 position, preferably with a C1-C20 alkyl group and which is not substituted at the 3, 5, and/or 6 positions, optionally, the 4 position can be substituted with a group 17 element or a C1-C20 alkyl group;
$R^2$ and $R^{10}$ are each, independently, -E($R^{12}$)($R^{13}$)— with E being carbon, silicon, or germanium, and each $R^{12}$ and $R^{13}$ being independently selected from the group consisting of hydrogen, hydrocarbyls, and substituted hydrocarbyls, alkoxy, silyl, amino, aryloxy, halogen, and phosphino, $R^{12}$ and $R^{13}$ may be joined to form a saturated, substituted or unsubstituted hydrocarbyl ring, where the ring has 4, 5, 6, or 7 ring carbon atoms and where substitutions on the ring can join to form additional rings, or $R^{12}$ and $R^{13}$ may be joined to form a saturated heterocyclic ring, or a saturated substituted heterocyclic ring where substitutions on the ring can join to form additional rings;

$R^3$, $R^4$, and $R^5$ are independently selected from the group consisting of hydrogen, hydrocarbyls, substituted hydrocarbyls, alkoxy, aryloxy, halogen, amino, and silyl, and wherein adjacent R groups ($R^3$ & $R^4$ and/or $R^4$ & $R^5$) may be joined to form a substituted or unsubstituted hydrocarbyl or heterocyclic ring, where the ring has 5, 6, 7, or 8 ring atoms and where substitutions on the ring can join to form additional rings;

$R^6$, $R^7$, $R^8$, $R^9$, $R^{15}$, and $R^{16}$ are independently selected from the group consisting of hydrogen, hydrocarbyls, substituted hydrocarbyls, alkoxy, halogen, amino, and silyl, and wherein adjacent R groups ($R^6$ & $R^7$, and/or $R^7$ & $R^{15}$, and/or $R^{16}$ & $R^{15}$, and/or $R^8$ & $R^9$) may be joined to form a saturated, substituted or unsubstituted hydrocarbyl or heterocyclic ring, where the ring has 5, 6, 7, or 8 ring carbon atoms and where substitutions on the ring can join to form additional rings;

L is an anionic leaving group, where the L groups may be the same or different and any two L groups may be linked to form a dianionic leaving group;

n is 0, 1, 2, 3, or 4;

L' is neutral Lewis base;

w is 0, 1, 2, 3, or 4;

wherein n+w is no greater than 4.

Preferably, the R groups above and other R groups mentioned hereafter, contain from 1 to 30, preferably 2 to 20 carbon atoms, especially from 6 to 20 carbon atoms.

Preferably, M is Ti, Zr, or Hf, and/or E is carbon, with Zr or Hf based complexes being especially preferred.

In a preferred embodiment, $R^{11}$ may be selected from phenyl groups that are variously substituted with between zero to five substituents that include F, Cl, Br, I, $CF_3$, $NO_2$, alkoxy, dialkylamino, aryl, and alkyl groups having 1 to 10 carbons, such as methyl, ethyl, propyl, butyl, pentyl, hexyl, heptyl, octyl, nonyl, decyl, and isomers thereof.

In one aspect, when $R^{11}$ is a phenyl group, it is substituted at the ortho position, the 2 position, adjacent to the point of attachment to the nitrogen (N) group of the organic ligand as shown in formulae (I) and (II). Preferably, the substituent is an alkyl group, such as C1-C20 alkyl groups, including methyl, ethyl, iso-propyl, propyl, butyl, sec-butyl, t-butyl, octyl, nonyl, dodecyl, etc. $R^{11}$ can be further substituted particularly at the 4 position by group 17 elements (preferably F, Cl, Br or I) or C1-C20 alkyl groups as described above. Preferably, the substituent at the ortho position is a C1-C5 group, including methyl, ethyl, iso-propyl, propyl, butyl, sec-butyl, t-butyl.

In another aspect, $R^{11}$ is not substituted at the 2 position with F, a fluoro group or a trifluoromethyl group.

In still another aspect, $R^{11}$ is substituted at the 2 and, optionally, the 4 positions as described above, but is not substituted at the 3, 5 and/or 6 positions.

In a preferred embodiment, L may be selected from halide, alkyl, aryl, alkoxy, amido, hydrido, phenoxy, hydroxy, silyl, allyl, alkenyl, and alkynyl. The selection of the leaving groups depends on the synthesis route adopted for arriving at the complex and may be changed by additional reactions to suit the later activation method in polymerization. For example, a preferred L is alkyl when using non-coordinating anions such as N,N-dimethylanilinium tetrakis(pentafluorophenyl)-borate or tris(pentafluorophenyl)borane. In another embodiment, two L groups may be linked to form a dianionic leaving group, for example oxalate.

In another embodiment, each L' is independently selected from the group consisting of ethers, thio-ethers, amines, nitriles, imines, pyridines, and phosphines, preferably ethers.

Preferred $R^2$ groups and preferred $R^{10}$ groups include $CH_2$, $CMe_2$, $SiMe_2$, $SiEt_2$, $SiPr_2$, $SiBu_2$, $SiPh_2$, $Si(aryl)_2$, $Si(alkyl)_2$, CH(aryl), CH(Ph), CH(alkyl), and CH(2-isopropylphenyl), preferably where alkyl is a $C_1$ to $C_{40}$ alkyl group, aryl is a $C_5$ to $C_{40}$ aryl group.

In any embodiment described herein, E is preferably carbon.

In any embodiment described herein, $R^2$ is represented by the formula:

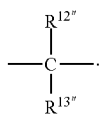

In any embodiment described herein, $R^{12''}$ is hydrogen, alkyl, aryl, or halogen; and $R^{13''}$ is hydrogen, alkyl, aryl, or halogen, preferably $R^{12''}$ and $R^{13''}$ are the same.

In any embodiment described herein, $R^6$, $R^7$, $R^8$, $R^9$, $R^{15}$, and $R^{16}$ may be, independently, selected from the group consisting of hydrogen, hydrocarbyls, substituted hydrocarbyls, alkoxy, halogen, amino, and silyl.

In any embodiment described herein, $R^3$, $R^4$, $R^5$, and $R^{11}$ may each contain from 1 to 30 carbon atoms, preferably $R^3$, $R^4$, $R^5$, $R^6$, $R^7$, $R^8$, $R^9$, $R^{15}$, and $R^{16}$ each contain from 1 to than 30 carbon atoms.

In any embodiment described herein, E is carbon and $R^{11}$ is selected from phenyl groups that are substituted with 0, 1, 2, 3, 4, or 5 substituents selected from the group consisting of F, Cl, Br, I, $CF_3$, $NO_2$, alkoxy, dialkylamino, hydrocarbyl, and substituted hydrocarbyls groups with from one to ten carbons.

In a preferred embodiment, the pyridyldiamido transition metal complex is represented by the Formula (I) or (II) above, and M is a Group 4 metal preferably Zr or Hf, preferably Hf.

In a preferred embodiment, the pyridyldiamido transition metal complex is represented by the Formula (I) or (II) above, the $R^2$ and $R^{10}$ groups are $-CH_2-$, M is a Group 4 metal (preferably Zr or Hf, preferably Hf) and $R^{11}$ is a phenyl group with substitution at the 2 position, but not further substituted at either the 3, 5 and/or 6 position, with the substituents preferably being C1-C5 alkyl groups, such as methyl, ethyl, propyl, butyl or pentyl.

In a preferred embodiment, the pyridyldiamido transition metal complex is represented by the Formula (I) or (II) above, wherein the $R^2$ and $R^{10}$ groups are $-CH_2-$, M is a Group 4 metal (preferably Zr or Hf, preferably Hf), $R^1$ is 2,6-diisopropylphenyl, and $R^{11}$ is a phenyl group with a substituent at the 2 position, preferably a C1-C5 alkyl group, such as methyl, ethyl, propyl, isopropyl, butyl or pentyl. In particular, the 3, 5 and 6 positions of the phenyl group are not substituted. It should be understood where a substituent is not denoted that the position is a hydrogen atom and/or a carbon bond that forms a ring.

In another embodiment, the 2 and 4 positions of the $R^{11}$ phenyl group are substituted with, each independently, C1-C20 alkyl groups and more particularly, C1-C5 alkyl groups.

In a second aspect of the invention, there are provided various processes for synthesizing the complexes described herein.

Ligand Synthesis

The pyridyl diamine ligands described herein are generally prepared in multiple steps. One step involves the preparation of an amine-containing "linker" group where the linker is typically a boronic acid ester of an aryl methyl amine or substituted amine. This amine-containing linker may be prepared from an aryl-methyl boronic ester in two steps, the first of which involves the conversion of the methyl group to a halo-methyl group by free radical halogenation in unreactive solvents (e.g., $CCl_4$, benzene). The second step then involves reaction of this halo-methyl group containing species with an amine or protected amine or deprotonated protected amine to yield an amine-containing linker. This amine-containing linker is then coupled with a suitable pyridine containing species, such as 6-bromo-2-pyridinecarboxaldehyde. This coupling step typically uses a metal catalyst (e.g., $Pd(PPh_3)_4$) in less than 5 mol % loading. Following this coupling step, the new derivative, which can be described as amine-linker-pyridine-aldehyde, is then reacted with a second amine to produce the imine derivative amine-linker-pyridine-imine in a condensation reaction. This can then be reduced to the pyridyl diamine ligand by reaction with a suitable aryl anion, alkyl anion, or hydride source. This reaction is generally performed in etherial solvents at temperatures between $-100°$ C. and $50°$ C. when aryllithium or alkyllithium reagents are employed. This reaction is generally performed in methanol at reflux when sodium cyanoborohydride is employed.

The preparation of pyridyl diamide metal complexes from pyridyl diamines may be accomplished using typical protonolysis and methylation reactions. In the protonolysis reaction, the pyridyl diamine is reacted with a suitable metal reactant to produce a pyridyldiamide metal complex. A suitable metal reactant will feature a basic leaving group that will accept a proton from the pyridyl diamine and then generally depart and be removed from the product. Suitable metal reactants include, but are not limited to, $HfBn_4$ ($Bn=CH_2Ph$), $ZrBn_4$, $TiBn_4$, $Hf(NMe_2)_4$, $Hf(NEt_2)_4$, $ZrBn_2Cl_2(OEt_2)$, $HfBn_2Cl_2(OEt_2)_2$, $Zr(NMe_2)_2Cl_2$(dimethoxyethane), and $Hf(NMe_2)_2Cl_2$(dimethoxyethane). Pyridyldiamide (PDA) metal complexes that contain metal-chloride groups, such as the PDA dichloride complex, can be alkylated by reaction with an appropriate organometallic reagent. Suitable reagents include organolithium and organomagnesium, and Grignard reagents. The alkylations are generally performed in etherial or hydrocarbon solvents or solvent mixtures at temperatures typically ranging from $-100°$ C. to $50°$ C.

Activators

After the complexes have been synthesized, catalyst systems may be formed by combining them with activators in any manner known from the literature including by supporting them for use in slurry or gas phase polymerization. The catalyst systems may also be added to or generated in solution polymerization or bulk polymerization (in the monomer). The catalyst system typically comprises a complex as described above and an activator such as alumoxane or a non-coordinating anion. Activation may be performed using alumoxane solution including methyl alumoxane, referred to as MAO, as well as modified MAO, referred to herein as MMAO, containing some higher alkyl groups to improve the solubility. Particularly useful MAO can be purchased from Albemarle in a 10 wt % solution in toluene. The catalyst system employed in the present invention preferably uses an activator selected from alumoxanes, such as methyl alumoxane, modified methyl alumoxane, ethyl alumoxane, iso-butyl alumoxane, and the like.

When an alumoxane or modified alumoxane is used, the complex-to-activator molar ratio is from about 1:3000 to 10:1; alternatively 1:2000 to 10:1; alternatively 1:1000 to 10:1; alternatively 1:500 to 1:1; alternatively 1:300 to 1:1; alternatively 1:200 to 1:1; alternatively 1:100 to 1:1; alternatively 1:50 to 1:1; and alternatively 1:10 to 1:1. When the activator is an alumoxane (modified or unmodified), some embodiments select the maximum amount of activator at a 5000-fold molar excess over the catalyst precursor (per metal catalytic site). The preferred minimum activator-to-complex ratio is 1:1 molar ratio.

Activation may also be performed using non-coordinating anions, referred to as NCA's, of the type described in EP 277 003 A1 and EP 277 004 A1. NCA may be added in the form of an ion pair using, for example, $[DMAH]^+[NCA]^-$ in which the N,N-dimethylanilinium (DMAH) cation reacts with a basic leaving group on the transition metal complex to form a transition metal complex cation and $[NCA]^-$. The cation in the precursor may, alternatively, be trityl. Alternatively, the transition metal complex may be reacted with a neutral NCA precursor, such as $B(C_6F_5)_3$, which abstracts an anionic group from the complex to form an activated species. Useful activators include N,N-dimethylanilinium tetrakis(pentafluorophenyl)borate (i.e., $[PhNMe_2H]B(C_6F_5)_4$) and N,N-dimethylanilinium tetrakis(heptafluoronaphthyl)borate, where Ph is phenyl, and Me is methyl.

Additionally, preferred activators useful herein include those described in U.S. Pat. No. 7,247,687 at column 169, line 50 to column 174, line 43, particularly column 172, line 24 to column 173, line 53.

Particularly preferred activators include: trimethylammonium tetraphenylborate, triethylammonium tetraphenylborate, tripropylammonium tetraphenylborate, tri(n-butyl)ammonium tetraphenylborate, tri(t-butyl)ammonium tetraphenylborate, N,N-dimethylanilinium tetraphenylborate, N,N-diethylanilinium tetraphenylborate, N,N-dimethyl-(2,4,6-trimethylanilinium)tetraphenylborate, tropillium tetraphenylborate, triphenylcarbenium tetraphenylborate, triphenylphosphonium tetraphenylborate triethylsilylium tetraphenylborate, benzene(diazonium)tetraphenylborate, trimethylammonium tetrakis(pentafluorophenyl)borate, triethylammonium tetrakis(pentafluorophenyl)borate, tripropylammonium tetrakis(pentafluorophenyl)borate, tri(n-butyl)ammonium tetrakis(pentafluorophenyl)borate, tri(sec-butyl)ammonium tetrakis(pentafluorophenyl)borate, N,N-dimethylanilinium tetrakis(pentafluorophenyl)borate, N,N-diethylanilinium tetrakis(pentafluorophenyl)borate, N,N-dimethyl-(2,4,6-trimethylanilinium)tetrakis(pentafluorophenyl)borate, tropillium tetrakis(pentafluorophenyl)borate, triphenylcarbenium tetrakis(pentafluorophenyl)borate, triphenylphosphonium tetrakis(pentafluorophenyl)borate, triethylsilylium tetrakis(pentafluorophenyl)borate, benzene(diazonium)tetrakis(pentafluorophenyl)borate, trimethylammonium tetrakis-(2,3,4,6-tetrafluorophenyl)borate, triethylammonium tetrakis-(2,3,4,6-tetrafluorophenyl)borate, tripropylammonium tetrakis-(2,3,4,6-tetrafluorophenyl)borate, tri(n-butyl)ammonium tetrakis-(2,3,4,6-tetrafluorophenyl)borate, dimethyl(t-butyl)ammonium tetrakis-(2,3,4,6-tetrafluorophenyl)borate, N,N-dimethylanilinium tetrakis-(2,3,4,6-tetrafluorophenyl)borate, N,N-diethylanilinium tetrakis-(2,3,4,6-tetrafluorophenyl)borate, N,N-dimethyl-(2,4,6-trimethylanilinium)tetrakis-(2,3,4,6-tetrafluorophenyl)borate, tropillium tetrakis-(2,3,4,6-tetrafluorophenyl)borate, triphenylcarbenium tetrakis-(2,3,4,6-tetrafluorophenyl)borate, triphenylphosphonium tetrakis-(2,3,4,6-tetrafluorophenyl)borate, triethylsilylium tetrakis-(2,3,4,6-tetrafluorophenyl)borate, benzene(diazonium)tetrakis-(2,3,4,6-tetrafluorophenyl)borate, trimethylammonium tetrakis(perfluoronaphthyl)borate, triethylammonium tetrakis(perfluoronaphthyl)borate, tripropylammonium tetrakis(perfluoronaphthyl)borate, tri(n-butyl)ammonium tetrakis(perfluoronaphthyl)borate, tri(t-butyl)ammonium tetrakis(perfluoronaphthyl)borate, N,N-dimethylanilinium tetrakis(perfluoronaphthyl)borate, N,N-diethylanilinium tetrakis(perfluoronaphthyl)borate, N,N-dimethyl-(2,4,6-trimethylanilinium)tetrakis(perfluoronaphthyl)borate, tropillium tetrakis(perfluoronaphthyl)borate, triphenylcarbenium tetrakis(perfluoronaphthyl)borate, triphenylphosphonium tetrakis(perfluoronaphthyl)borate, triethylsilylium tetrakis(perfluoronaphthyl)borate, benzene(diazonium)tetrakis(perfluoronaphthyl)borate, trimethylammonium tetrakis(perfluorobiphenyl)borate, triethylammonium tetrakis(perfluorobiphenyl)borate, tripropylammonium tetrakis(perfluorobiphenyl)borate, tri(n-butyl)ammonium tetrakis(perfluorobiphenyl)borate, tri(t-butyl)ammonium tetrakis(perfluorobiphenyl)borate, N,N-dimethylanilinium tetrakis(perfluorobiphenyl)borate, N,N-diethylanilinium tetrakis(perfluorobiphenyl)borate, N,N-dimethyl-(2,4,6-trimethylanilinium)tetrakis(perfluorobiphenyl)borate, tropillium tetrakis(perfluorobiphenyl)borate, triphenylcarbenium tetrakis(perfluorobiphenyl)borate, triphenylphosphonium tetrakis(perfluorobiphenyl)borate, triethylsilylium tetrakis(perfluorobiphenyl)borate, benzene(diazonium)tetrakis(perfluorobiphenyl)borate, trimethylammonium tetrakis(3,5-bis(trifluoromethyl)phenyl)borate, triethylammonium tetrakis(3,5-bis(trifluoromethyl)phenyl)borate, tripropylammonium tetrakis(3,5-bis(trifluoromethyl)phenyl)borate, tri(n-butyl)ammonium tetrakis(3,5-bis(trifluoromethyl)phenyl)borate, tri(t-butyl)ammonium tetrakis(3,5-bis(trifluoromethyl)phenyl)borate, N,N-dimethylanilinium tetrakis(3,5-bis(trifluoromethyl)phenyl)borate, N,N-diethylanilinium tetrakis(3,5-bis(trifluoromethyl)phenyl)borate, N,N-dimethyl-(2,4,6-trimethylanilinium)tetrakis(3,5-bis(trifluoromethyl)phenyl)borate, tropillium tetrakis(3,5-bis(trifluoromethyl)phenyl)borate, triphenylcarbenium tetrakis(3,5-bis(trifluoromethyl)phenyl)borate, triphenylphosphonium tetrakis(3,5-bis(trifluoromethyl)phenyl)borate, triethylsilylium tetrakis(3,5-bis(trifluoromethyl)phenyl)borate, benzene(diazonium)tetrakis(3,5-bis(trifluoromethyl)phenyl)borate, di-(i-propyl)ammonium tetrakis(pentafluorophenyl)borate, dicyclohexylammonium tetrakis(pentafluorophenyl)borate; tri(o-tolyl)phosphonium tetrakis(pentafluorophenyl)borate, tri(2,6-dimethylphenyl)phosphonium tetrakis(pentafluorophenyl)borate, trimethylammonium tetrakis(perfluoronaphthyl)borate, triethylammonium tetrakis(perfluoronaphthyl)borate, tripropylammonium tetrakis(perfluoronaphthyl)borate, tri(n-butyl)ammonium tetrakis(perfluoronaphthyl)borate, tri(t-butyl)ammonium tetrakis(perfluoronaphthyl)borate, N,N-dimethylanilinium tetrakis(perfluoronaphthyl)borate, N,N-diethylanilinium tetrakis(perfluoronaphthyl)borate, N,N-dimethyl-(2,4,6-trimethylanilinium)tetrakis(perfluoronaphthyl)borate, tropillium tetrakis(perfluoronaphthyl)borate, triphenylcarbenium tetrakis(perfluoronaphthyl)borate, triphenylphosphonium tetrakis(perfluoronaphthyl)borate, triethylsilylium tetrakis(perfluoronaphthyl)borate, benzene(diazonium)tetrakis(perfluoronaphthyl)borate, trimethylammonium tetrakis(perfluorobiphenyl)borate, triethylammonium tetrakis(perfluorobiphenyl)borate, tripropylammonium tetrakis(perfluorobiphenyl)borate, tri(n-butyl)ammonium tetrakis(perfluorobiphenyl)borate, tri(t-butyl)ammonium tetrakis(perfluorobiphenyl)borate, N,N-dimethylanilinium tetrakis(perfluorobiphenyl)borate, N,N-diethylanilinium tetrakis(perfluorobiphenyl)borate, N,N-dimethyl-(2,4,6-trimethylanilinium)tetrakis(perfluorobiphenyl)borate, tropillium tetrakis(perfluorobiphenyl)borate, triphenylcarbenium tetrakis(perfluorobiphenyl)borate, triphenylphosphonium tetrakis(perfluorobiphenyl)borate, triethylsilylium tetrakis(perfluorobiphenyl)borate, benzene(diazonium)tetrakis(perfluorobiphenyl)borate, [4-t-butyl-PhNMe$_2$H][($C_6F_3$($C_6F_5$)$_2$)$_4$B], (where Ph is phenyl and Me is methyl), and the NCA's disclosed in U.S. Pat. No. 7,297,653.

Most preferably, the ionic stoichiometric activator is N,N-dimethylanilinium tetrakis(perfluoronaphthyl)borate, N,N-dimethylanilinium tetrakis(perfluorobiphenyl)borate, N,N-dimethylanilinium tetrakis(3,5-bis(trifluoromethyl)phenyl)borate, triphenylcarbenium tetrakis(perfluoronaphthyl)borate, triphenylcarbenium tetrakis(perfluorobiphenyl)borate, triphenylcarbenium tetrakis(3,5-bis(trifluoromethyl)phenyl)borate, or triphenylcarbenium tetrakis(perfluorophenyl)borate.

When an NCA (such as an ionic or neutral stoichiometric activator) is used, the complex-to-activator molar ratio is typically from 1:10 to 1:1; 1:10 to 10:1; 1:10 to 2:1; 1:10 to 3:1; 1:10 to 5:1; 1:2 to 1.2:1; 1:2 to 10:1; 1:2 to 2:1; 1:2 to 3:1; 1:2 to 5:1; 1:3 to 1.2:1; 1:3 to 10:1; 1:3 to 2:1; 1:3 to 3:1; 1:3 to 5:1; 1:5 to 1:1; 1:5 to 10:1; 1:5 to 2:1; 1:5 to 3:1; 1:5 to 5:1; and 1:1 to 1:1.2.

Alternately, a co-activator may also be used in the catalyst system herein. The complex-to-co-activator molar ratio is from 1:100 to 100:1; 1:75 to 75:1; 1:50 to 50:1; 1:25 to 25:1; 1:15 to 15:1; 1:10 to 10:1; 1:5 to 5:1, 1:2 to 2:1; 1:100 to 1:1; 1:75 to 1:1; 1:50 to 1:1; 1:25 to 1:1; 1:15 to 1:1; 1:10 to 1:1; 1:5 to 1:1; 1:2 to 1:1; and 1:10 to 2:1.

Supports

In some embodiments, the complexes described herein may be supported (with or without an activator) by any method effective to support other coordination catalyst systems, effective meaning that the catalyst so prepared can be used for oligomerizing or polymerizing olefin in a heterogeneous process. The catalyst precursor, activator, co-activator if needed, suitable solvent, and support may be added in any order or simultaneously. Typically, the complex and activator may be combined in solvent to form a solution. Then the support is added, and the mixture is stirred for 1 minute to 10 hours. The total solution volume may be greater than the pore volume of the support, but some embodiments limit the total solution volume below that needed to form a gel or slurry (about 90% to 400%, preferably about 100-200% of the pore volume). After stirring, the residual solvent is removed under vacuum, typically at ambient temperature and over 10-16 hours. But greater or lesser times and temperatures are possible.

The complex may also be supported absent the activator; in that case, the activator (and co-activator if needed) is added to a polymerization process's liquid phase. Additionally, two or more different complexes may be placed on the same support. Likewise, two or more activators or an activator and co-activator may be placed on the same support.

Suitable solid particle supports are typically comprised of polymeric or refractory oxide materials, each being preferably porous. Preferably any support material that has an average particle size greater than 10 µm is suitable for use in this invention. Various embodiments select a porous support material, such as for example, talc, inorganic oxides, inorganic chlorides, for example magnesium chloride and resinous support materials such as polystyrene polyolefin or polymeric compounds or any other organic support material and the like. Some embodiments select inorganic oxide materials as the support material including Group-2, -3, -4, -5, -13, or -14 metal or metalloid oxides. Some embodiments select the catalyst support materials to include silica, alumina, silica-alumina, and their mixtures. Other inorganic oxides may serve either alone or in combination with the silica, alumina, or silica-alumina. These are magnesia, titania, zirconia, and the like. Lewis acidic materials such as montmorillonite and similar clays may also serve as a support. In this case, the support can optionally double as the activator component; however, an additional activator may also be used.

The support material may be pretreated by any number of methods. For example, inorganic oxides may be calcined, chemically treated with dehydroxylating agents such as aluminum alkyls and the like, or both.

As stated above, polymeric carriers will also be suitable in accordance with the invention, see for example the descriptions in WO 95/15815 and U.S. Pat. No. 5,427,991. The methods disclosed may be used with the catalyst complexes, activators or catalyst systems of this invention to adsorb or absorb them on the polymeric supports, particularly if made up of porous particles, or may be chemically bound through functional groups bound to or in the polymer chains.

Useful supports typically have a surface area of from 10-700 $m^2/g$, a pore volume of 0.1-4.0 cc/g and an average particle size of 10-500 μm. Some embodiments select a surface area of 50-500 $m^2/g$, a pore volume of 0.5-3.5 cc/g, or an average particle size of 20-200 μm. Other embodiments select a surface area of 100-400 $m^2/g$, a pore volume of 0.8-3.0 cc/g, and an average particle size of 30-100 μm. Useful supports typically have a pore size of 10-1000 Angstroms, alternatively 50-500 Angstroms, or 75-350 Angstroms.

The catalyst complexes described herein are generally deposited on the support at a loading level of 10-100 micromoles of complex per gram of solid support; alternately 20-80 micromoles of complex per gram of solid support; or 40-60 micromoles of complex per gram of support. But greater or lesser values may be used provided that the total amount of solid complex does not exceed the support's pore volume.

Polymerization

Inventive catalyst complexes are useful in polymerizing unsaturated monomers conventionally known to undergo metallocene-catalyzed polymerization such as solution, slurry, gas-phase, and high-pressure polymerization. Typically one or more of the complexes described herein, one or more activators, and one or more monomers are contacted to produce polymer. In certain embodiments, the complexes may be supported and as such will be particularly useful in the known, fixed-bed, moving-bed, fluid-bed, slurry, solution, or bulk operating modes conducted in single, series, or parallel reactors.

One or more reactors in series or in parallel may be used in the present invention. The complexes, activator and when required, co-activator, may be delivered as a solution or slurry, either separately to the reactor, activated in-line just prior to the reactor, or preactivated and pumped as an activated solution or slurry to the reactor. Polymerizations are carried out in either single reactor operation, in which monomer, comonomers, catalyst/activator/co-activator, optional scavenger, and optional modifiers are added continuously to a single reactor or in series reactor operation, in which the above components are added to each of two or more reactors connected in series. The catalyst components can be added to the first reactor in the series. The catalyst component may also be added to both reactors, with one component being added to first reaction and another component to other reactors. In one preferred embodiment, the complex is activated in the reactor in the presence of olefin.

In a particularly preferred embodiment, the polymerization process is a continuous process.

Polymerization processes used herein typically comprise contacting one or more alkene monomers with the complexes (and, optionally, activator) described herein. For purpose of this invention, alkenes are defined to include multi-alkenes (such as dialkenes) and alkenes having just one double bond. Polymerization may be homogeneous (solution or bulk polymerization) or heterogeneous (slurry—in a liquid diluent, or gas phase—in a gaseous diluent). In the case of heterogeneous slurry or gas phase polymerization, the complex and activator may be supported. Silica is useful as a support herein. Chain transfer agents (such as hydrogen or diethyl zinc) may be used in the practice of this invention.

The present polymerization processes may be conducted under conditions preferably including a temperature of about 30° C. to about 200° C., preferably from 60° C. to 195° C., preferably from 75° C. to 190° C. The process may be conducted at a pressure of from 0.05 MPa to 1500 MPa. In a preferred embodiment, the pressure is between 1.7 MPa and 30 MPa, or in another embodiment, especially under supercritical conditions, the pressure is between 15 MPa and 1500 MPa.

Monomers

Monomers useful herein include olefins having from 2 to 20 carbon atoms, alternately 2 to 12 carbon atoms (preferably ethylene, propylene, butylene, pentene, hexene, heptene, octene, nonene, decene, and dodecene) and optionally also polyenes (such as dienes). Particularly preferred monomers include ethylene, and mixtures of $C_2$ to $C_{10}$ alpha olefins, such as ethylene-propylene, ethylene-hexene, ethylene-octene, propylene-hexene, and the like.

The complexes described herein are also particularly effective for the polymerization of ethylene, either alone or in combination with at least one other olefinically unsaturated monomer, such as a $C_3$ to $C_{20}$ α-olefin, and particularly a $C_3$ to $C_{12}$ α-olefin. Likewise, the present complexes are also particularly effective for the polymerization of propylene, either alone or in combination with at least one other olefinically unsaturated monomer, such as ethylene or a $C_4$ to $C_{20}$ α-olefin, and particularly a $C_4$ to $C_{20}$ α-olefin. Examples of preferred α-olefins include ethylene, propylene, butene-1, pentene-1, hexene-1, heptene-1, octene-1, nonene-1, decene-1, dodecene-1,4-methylpentene-1,3-methylpentene-1,3,5,5-trimethylhexene-1, and 5-ethylnonene-1.

In some embodiments, the monomer mixture may also comprise one or more dienes at up to 10 wt %, such as from 0.00001 to 1.0 wt %, for example from 0.002 to 0.5 wt %, such as from 0.003 to 0.2 wt %, based upon the monomer mixture. Non-limiting examples of useful dienes include, cyclopentadiene, norbornadiene, dicyclopentadiene, 5-ethylidene-2-norbornene, 5-vinyl-2-norbornene, 1,4-hexadiene, 1,5-hexadiene, 1,5-heptadiene, 1,6-heptadiene, 6-methyl-1,6-heptadiene, 1,7-octadiene, 7-methyl-1,7-octadiene, 1,9-decadiene, 1 and 9-methyl-1,9-decadiene.

Where olefins are used that give rise to short chain branching, such as propylene, the catalyst systems may, under appropriate conditions, generate stereoregular polymers or polymers having stereoregular sequences in the polymer chains.

Scavengers

In some embodiments, when using the complexes described herein, particularly when they are immobilized on a support, the catalyst system will additionally comprise one or more scavenging compounds. Here, the term scavenging compound means a compound that removes polar impurities from the reaction environment. These impurities adversely affect catalyst activity and stability. Typically, the scavenging compound will be an organometallic compound such as the Group-13 organometallic compounds of U.S. Pat. Nos. 5,153,157, 5,241,025 and WO-A-91/09882, WO-A-94/03506, WO-A-93/14132, and that of WO 95/07941. Exemplary compounds include triethyl aluminum, triethyl borane, tri-iso-butyl aluminum, methyl alumoxane, iso-butyl alumoxane, and tri-n-octyl aluminum. Those scavenging compounds having bulky or $C_6$-$C_{20}$ linear hydrocarbyl substituents connected to the metal or metalloid center usually minimize adverse interaction with the active catalyst. Examples include triethylaluminum, but more preferably, bulky compounds such as tri-iso-butyl aluminum, tri-iso-prenyl aluminum, and long-chain linear alkyl-substituted aluminum compounds, such as tri-n-hexyl aluminum, tri-n-octyl aluminum, or tri-n-dodecyl aluminum. When alumoxane is used as the activator, any excess over that needed for activation will scavenge impurities and additional scavenging compounds may be unnecessary. Alumoxanes also may be added in scavenging quantities with other activators, e.g., methylalumoxane, $[Me_2HNPh]^+[B(pfp)_4]^-$ or $B(pfp)_3$ (perfluorophenyl=pfp=$C_6F_5$).

Preferred aluminum scavengers useful in the invention include those where there is an oxygen present. That is, the material per se or the aluminum mixture used as a scavenger, includes an aluminum/oxygen species, such as an alumoxane or alkylaluminum oxides, e.g., dialkyaluminum oxides, such as bis(diisobutylaluminum) oxide. In one aspect, aluminum containing scavengers can be represented by the formula $((R_z\text{—}Al\text{—})_y O\text{—})_x$, wherein z is 1-2, y is 1-2, x is 1-100, and R is a C1-C12 hydrocarbyl group. In another aspect, the scavenger has an oxygen to aluminum (O/Al) molar ratio of from about 0.25 to about 1.5, more particularly from about 0.5 to about 1.

In a preferred embodiment, two or more complexes are combined with diethyl zinc in the same reactor with monomer. Alternately, one or more complexes are combined with another catalyst (such as a metallocene) and diethyl zinc in the same reactor with monomer.

Polymer Products

While the molecular weight of the polymers produced herein is influenced by reactor conditions including temperature, monomer concentration and pressure, the presence of chain terminating agents and the like, the homopolymer and copolymer products produced by the present process may have an Mw of about 1,000 to about 2,000,000 g/mol, alternately of about 30,000 to about 600,000 g/mol, or alternately of about 100,000 to about 500,000 g/mol, as determined by GPC. Preferred polymers produced here may be homopolymers or copolymers. In a preferred embodiment, the comonomer(s) are present at up to 50 mol %, preferably from 0.01 to 40 mol %, preferably 1 to 30 mol %, preferably from 5 to 20 mol %.

In some embodiments herein, a multimodal polyolefin composition is produced, comprising a first polyolefin component and at least another polyolefin component, different from the first polyolefin component by molecular weight, preferably such that the GPC trace has more than one peak or inflection point.

Measurements of weight average molecular weight (Mw), number average molecular weight (Mn), and z average molecular weight (Mz) are determined by Gel Permeation Chromatography (GPC) as described in Macromolecules, 2001, Vol. 34, No. 19, pg. 6812, which is fully incorporated herein by reference, including that, a High Temperature Size Exclusion Chromatograph (SEC, Waters Alliance 2000), equipped with a differential refractive index detector (DRI) equipped with three Polymer Laboratories PLgel 10 mm Mixed-B columns is used. The instrument is operated with a flow rate of 1.0 cm$^3$/min, and an injection volume of 300 µL. The various transfer lines, columns and differential refractometer (the DRI detector) are housed in an oven maintained at 145° C. Polymer solutions are prepared by heating 0.75 to 1.5 mg/mL of polymer in filtered 1,2,4-(TCB) containing ~1000 ppm of butylated hydroxy toluene (BHT) at 160° C. for 2 hours with continuous agitation. A sample of the polymer containing solution is injected into the GPC and eluted using filtered 1,2,4-trichlorobenzene (TCB) containing ~1000 ppm of BHT. The separation efficiency of the column set is calibrated using a series of narrow MWD polystyrene standards reflecting the expected Mw range of the sample being analyzed and the exclusion limits of the column set. Seventeen individual polystyrene standards, obtained from Polymer Laboratories (Amherst, Mass.) and ranging from Peak Molecular Weight (Mp) ~580 to 10,000,000, were used to generate the calibration curve. The flow rate is calibrated for each run to give a common peak position for a flow rate marker (taken to be the positive inject peak) before determining the retention volume for each polystyrene standard. The flow marker peak position is used to correct the flow rate when analyzing samples. A calibration curve (log(Mp) vs. retention volume) is generated by recording the retention volume at the peak in the DRI signal for each PS standard, and fitting this data set to a 2nd-order polynomial. The equivalent polyethylene molecular weights are determined by using the Mark-Houwink coefficients shown in Table B.

TABLE B

| Mark-Houwink coefficients | | |
|---|---|---|
| Material | K (dL/g) | α |
| PS | $1.75 \times 10^{-4}$ | 0.67 |
| PE | $5.79 \times 10^{-4}$ | 0.695 |

In a preferred embodiment, the homopolymer and copolymer products produced by the present process may have an Mw of about 1,000 to about 2,000,000 g/mol, alternately of about 30,000 to about 600,000 g/mol, or alternately of about 100,000 to about 500,000 g/mol, as determined by GPC and have a multi-modal, preferably bimodal, Mw/Mn.

Blending and Processing

The polymers described herein may be formed into articles using conventional equipment and methods, such as by dry blending the individual components and subsequently melt mixing in a mixer, or by mixing the components together directly in a mixer, such as, for example, a Banbury mixer, a Haake mixer, a Brabender internal mixer, or a single or twin-screw extruder, which may include a compounding extruder and a side-arm extruder used directly downstream of a polymerization process. Additionally, additives may be included in the blend, in one or more components of the blend, and/or in a product formed from the blend, such as a film, as desired. Such additives are well known in the art, and can include, for example: fillers; antioxidants (e.g., hindered phenolics such as IRGANOX™ 1010 or IRGANOX™ 1076 available from Ciba-Geigy); phosphites (e.g., IRGAFOS™ 168 available from Ciba-Geigy); anti-cling additives; tackifiers, such as polybutenes, terpene resins, aliphatic and aromatic hydrocarbon resins, alkali metal and glycerol stearates and hydrogenated rosins; UV stabilizers; heat stabilizers; antiblocking agents; release agents; anti-static agents; pigments; colorants; dyes; waxes; silica; fillers; talc; and the like.

Applications

Articles made using polymers produced herein may include, for example, molded articles (such as containers and bottles, e.g., household containers, industrial chemical containers, personal care bottles, medical containers, fuel tanks, and storageware, toys, sheets, pipes, tubing) films, non-wovens, and the like. It should be appreciated that the list of applications above is merely exemplary, and is not intended to be limiting.

The polymer compositions described herein are useful in a wide variety of applications, including transparent articles such as cook and storage ware, and in other articles such as furniture, automotive components, toys, sportswear, medical devices, sterilizable medical devices and sterilization containers, nonwoven fibers and fabrics and articles therefrom such as drapes, gowns, filters, hygiene products, diapers, and films, oriented films, sheets, tubes, pipes and other items where softness, high impact strength, and impact strength below freezing are important.

Additional examples of desirable articles of manufacture made from compositions of the invention include films, sheets, fibers, woven and nonwoven fabrics, automotive components, furniture, sporting equipment, food storage containers, transparent and semi-transparent articles, toys, tubing and pipes, sheets, packaging, bags, sacks, coatings, caps, closures, crates, pallets, cups, non-food containers, pails, insulation, and medical devices. Further examples include automotive components, wire and cable jacketing, pipes, agricultural films, geomembranes, toys, sporting equipment, medical devices, casting and blowing of packaging films, extrusion of tubing, pipes and profiles, sporting equipment, outdoor furniture (e.g., garden furniture) and playground equipment, boat and water craft components, and other such articles.

Films

The compositions described above and the blends thereof may be formed into monolayer or multilayer films. These films may be formed by any of the conventional techniques known in the art including extrusion, co-extrusion, extrusion coating, lamination, blowing and casting. The film may be obtained by the flat film or tubular process which may be followed by orientation in a uniaxial direction or in two mutually perpendicular directions in the plane of the film. One or more of the layers of the film may be oriented in the transverse and/or longitudinal directions to the same or different extents. This orientation may occur before or after the individual layers are brought together. For example, a polyethylene layer can be extrusion coated or laminated onto an oriented polypropylene layer or the polyethylene and polypropylene can be coextruded together into a film then oriented. Likewise, oriented polypropylene could be laminated to oriented polyethylene or oriented polyethylene could be coated onto polypropylene, then optionally the combination could be oriented even further. Typically the films are oriented in the Machine Direction (MD) at a ratio of up to 15, preferably between 5 and 7, and in the Transverse Direction (TD) at a ratio of up to 15 preferably 7 to 9. However, in another embodiment, the film is oriented to the same extent in both the MD and TD directions.

In multilayer constructions, the other layer(s) may be any layer typically included in multilayer film structures. For example, the other layer or layers may be:

1. Polyolefins. Preferred polyolefins include homopolymers or copolymers of $C_2$ to $C_{40}$ olefins, preferably $C_2$ to $C_{20}$ olefins, preferably a copolymer of an alpha-olefin and another olefin or alpha-olefin (ethylene is defined to be an alpha-olefin for purposes of this invention). Preferably homopolyethylene, homopolypropylene, propylene copolymerized with ethylene and or butene, ethylene copolymerized with one or more of propylene, butene or hexene, and optional dienes. Preferred examples include thermoplastic polymers such as ultra-low density polyethylene, very low density polyethylene, linear low density polyethylene, low density polyethylene, medium density polyethylene, high density polyethylene, polypropylene, isotactic polypropylene, highly isotactic polypropylene, syndiotactic polypropylene, random copolymer of propylene and ethylene and/ or butene and/or hexene, elastomers such as ethylene propylene rubber, ethylene propylene diene monomer rubber, neoprene, and blends of thermoplastic polymers and elastomers, such as, for example, thermoplastic elastomers and rubber toughened plastics.
2. Polar polymers. Preferred polar polymers include homopolymers and copolymers of esters, amides, acetates, anhydrides, copolymers of a $C_2$ to $C_{20}$ olefin, such as ethylene and/or propylene and/or butene with one or more polar monomers such as acetates, anhydrides, esters, alcohol, and or acrylics. Preferred examples include polyesters, polyamides, ethylene vinyl acetate copolymers, and polyvinyl chloride.
3. Cationic polymers. Preferred cationic polymers include polymers or copolymers of geminally disubstituted olefins, alpha-heteroatom olefins and/or styrenic monomers. Preferred geminally disubstituted olefins include isobutylene, isopentene, isoheptene, isohexane, isooctene, isodecene, and isododecene. Preferred alpha-heteroatom olefins include vinyl ether and vinyl carbazole, preferred styrenic monomers include styrene, alkyl styrene, para-alkyl styrene, alpha-methyl styrene, chloro-styrene, and bromo-para-methyl styrene. Preferred examples of cationic polymers include butyl rubber, isobutylene copolymerized with para methyl styrene, polystyrene, and poly-alpha-methyl styrene.
4. Miscellaneous. Other preferred layers can be paper, wood, cardboard, metal, metal foils (such as aluminum foil and tin foil), metallized surfaces, glass (including silicon oxide ($SiO_x$) coatings applied by evaporating silicon oxide onto a film surface), fabric, spunbonded fibers, and non-wovens (particularly polypropylene spun bonded fibers or non-wovens), and substrates coated with inks, dyes, pigments, and the like.

The films may vary in thickness depending on the intended application; however, films of a thickness from 1 μm to 250 μm are usually suitable. Films intended for packaging are usually from 10 to 60 micron thick. The thickness of the sealing layer is typically 0.2 μm to 50 μm. There may be a sealing layer on both the inner and outer surfaces of the film or the sealing layer may be present on only the inner or the outer surface.

Additives such as block, antiblock, antioxidants, pigments, fillers, processing aids, UV stabilizers, neutralizers, lubricants, surfactants and/or nucleating agents may also be present in one or more than one layer in the films. Preferred additives include silicon dioxide, titanium dioxide, polydimethylsiloxane, talc, dyes, wax, calcium sterate, carbon black, low molecular weight resins and glass beads, preferably these additives are present at from 0.1 ppm to 1000 ppm.

In another embodiment, one more layers may be modified by corona treatment, electron beam irradiation, gamma irradiation, or microwave irradiation. In a preferred embodiment, one or both of the surface layers is modified by corona treatment.

The films described herein may also comprise from 5 wt % to 60 wt %, based upon the weight of the polymer and the resin, of a hydrocarbon resin. The resin may be combined with the polymer of the seal layer(s) or may be combined with the polymer in the core layer(s). The resin preferably has a softening point above 100° C., even more preferably from 130° C. to 180° C. Preferred hydrocarbon resins include those described above. The films comprising a hydrocarbon resin may be oriented in uniaxial or biaxial directions to the same or different degrees. For more information on blends of tackifiers and modifiers useful herein, see U.S. Ser. No. 60/617,594, filed Oct. 8, 2004.

The films described above may be used as stretch and/or cling films. Stretch/cling films are used in various bundling, packaging and palletizing operations. To impart cling properties to, or improve the cling properties of, a particular film, a number of well-known tackifying additives have been utilized. Common tackifying additives include polybutenes, terpene resins, alkali metal stearates and hydrogenated rosins and rosin esters. The cling properties of a film can also be modified by the well-known physical process referred to as corona discharge. Some polymers (such as ethylene methyl acrylate copolymers) do not need cling additives and can be used as cling layers without tackifiers. Stretch/clings films may comprise a slip layer comprising any suitable polyolefin or combination of polyolefins such as polyethylene, polypropylene, copolymers of ethylene and propylene, and polymers obtained from ethylene and/or propylene copolymerized with minor amounts of other olefins, particularly $C_4$ to $C_{12}$ olefins. Particularly, preferred is linear low density polyethylene (LLDPE). Additionally, the slip layer may include one or more anticling (slip and/or antiblock) additives which may be added during the production of the polyolefin or subsequently blended in to improve the slip properties of this layer. Such additives are well-known in the art and include, for example, silicas, silicates, diatomaceous earths, talcs, and various lubricants. These additives are preferably utilized in amounts ranging from about 100 ppm to about 20,000 ppm, more preferably between about 500 ppm to about 10,000 ppm, by weight based upon the weight of the slip layer. The slip layer may, if desired, also include one or more other additives as described above.

In another embodiment, this invention relates to:
1. A method to prepare a polyolefin comprising the step:
contacting an olefinic monomer or olefinic monomers with a pyridyldiamido transition metal catalyst, optionally an activator, and an aluminum containing scavenger that has an oxygen to aluminum (O/Al) molar ratio from about 0.25 and about 1.5.
2. The method of paragraph 1, wherein the olefinic monomers are one or more of ethylene, a propylene, a butylene, a hexane or an octene.
3. The method of paragraph 1, wherein the olefinic monomer is ethylene or propylene.
4. The method of paragraph 1, wherein the olefinic monomers are propylene and ethylene.
5. The method of paragraph 1, further comprising a trialkyl aluminum compound present in a concentration of from about 1 micromolar to about 50 micromolar.
6. The method of any of paragraphs 1 through 5, wherein the activator is a non-coordinating anion activator.
7. The method of paragraph 6, wherein the non-coordinating activator is N,N'-dimethylanilinium tetrakis(pentafluorophenyl)borate.
8. The method of any of paragraphs 1 through 7, wherein the concentration activator is present from about 0.1 molar equivalents to about 10 molar equivalents, based on the transition metal catalyst.
9. The method of paragraph 8, wherein the concentration of activator present is about 1 molar equivalent.
10. The method of any of paragraphs 1 through 9, wherein the pyridyldiamido transition metal catalyst is represented by the formula (I) or (II):

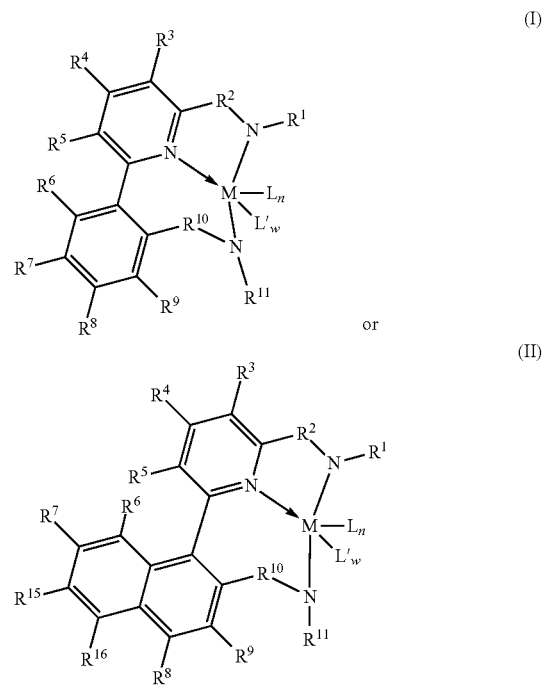

wherein:
M is a Group 3, 4, 5, 6, 7, 8, 9, 10, 11, or 12 metal;
$R^1$ and $R^{11}$ are each independently selected from the group consisting of hydrocarbyls, substituted hydrocarbyls, and silyl groups;
$R^2$ and $R^{10}$ are each, independently, $-E(R^{12})(R^{13})-$ with E being carbon, silicon, or germanium, and each $R^{12}$ and $R^{13}$ being independently selected from the group consisting of hydrogen, hydrocarbyls, and substituted hydrocarbyls, alkoxy, silyl, amino, aryloxy, halogen, and phosphino, $R^{12}$ and $R^{13}$ may be joined to form a saturated, substituted or unsubstituted hydrocarbyl ring, where the ring has 4, 5, 6, or 7 ring carbon atoms and where substitutions on the ring can join to form additional rings, or $R^{12}$ and $R^{13}$ may be joined to form a saturated heterocyclic ring, or a saturated substituted heterocyclic ring where substitutions on the ring can join to form additional rings;
$R^3$, $R^4$, and $R^5$ are independently selected from the group consisting of hydrogen, hydrocarbyls, substituted hydrocarbyls, alkoxy, aryloxy, halogen, amino, and silyl, and wherein adjacent R groups ($R^3$ & $R^4$ and/or $R^4$ & $R^5$) may be joined to form a substituted or unsubstituted hydrocarbyl or heterocyclic ring, where the ring has 5, 6, 7, or 8 ring atoms and where substitutions on the ring can join to form additional rings;
$R^6$, $R^7$, $R^8$, $R^9$, $R^{15}$, and $R^{16}$ are independently selected from the group consisting of hydrogen, hydrocarbyls, substituted hydrocarbyls, alkoxy, halogen, amino, and silyl, and wherein adjacent R groups ($R^6$ & $R^7$, and/or $R^7$ & $R^{15}$, and/or $R^{16}$ &

$R^{15}$, and/or $R^8$ & $R^9$) may be joined to form a saturated, substituted or unsubstituted hydrocarbyl or heterocyclic ring, where the ring has 5, 6, 7, or 8 ring carbon atoms and where substitutions on the ring can join to form additional rings;

L is an anionic leaving group, where the L groups may be the same or different and any two L groups may be linked to form a dianionic leaving group;

n is 0, 1, 2, 3, or 4;

L' is neutral Lewis base;

w is 0, 1, 2, 3, or 4; and wherein n+w is no greater than 4.

11. The method of paragraph 10, wherein M is Ti, Zr, or Hf.

12. The method of either of paragraphs 10 or 11, wherein $R^6$, $R^7$, $R^8$, $R^9$, $R^{15}$, and $R^{16}$, are independently selected from the group consisting of hydrogen, hydrocarbyls, substituted hydrocarbyls, alkoxy, halogen, amino, and silyl.

13. The method of any of paragraphs 10 through 12, wherein each L is independently selected from the group consisting of halide, alkyl, aryl, alkoxy, amido, hydrido, phenoxy, hydroxy, silyl, allyl, alkenyl, and alkynyl.

14. The method of any of paragraphs 10 through 13, wherein each L' is independently selected from the group consisting of ethers, thio-ethers, amines, nitriles, imines, pyridines, and phosphines.

15. The method of any of paragraphs 10 through 14, wherein the $R^2$ group(s) are selected from the group consisting of $CH_2$, $CMe_2$, $SiMe_2$, $SiEt_2$, $SiPr_2$, $SiBu_2$, $SiPh_2$, $Si(aryl)_2$, and $Si(alkyl)_2$, CH(aryl), CH(Ph), CH(alkyl), CH(2-isopropylphenyl), where alkyl is a $C_1$ to $C_{40}$ alkyl group, aryl is a $C_5$ to $C_{40}$ aryl group.

16. The method of any of paragraphs 10 through 15, wherein the $R^{10}$ group(s) are selected from the group consisting of $CH_2$, $CMe_2$, $SiMe_2$, $SiEt_2$, $SiPr_2$, $SiBu_2$, $SiPh_2$, $Si(aryl)_2$, and $Si(alkyl)_2$, CH(aryl), CH(Ph), CH(alkyl), CH(2-isopropylphenyl), where alkyl is a $C_1$ to $C_{40}$ alkyl group, aryl is a $C_5$ to $C_{40}$ aryl group, and Ph is phenyl.

17. The method of any of paragraphs 10 through 16, wherein $R^{11}$ is an ortho alkyl substituted phenyl group.

18. The method of paragraph 17, wherein the ortho alkyl substituent is a methyl, ethyl, iso-propyl, propyl, butyl, or isobutyl group.

19. The method of either of paragraphs 17 or 18, wherein the remaining positions of the phenyl group are hydrogen atoms or the 4 and 6 positions are substituted by an alkyl group.

20. The method of any of paragraphs 1 through 19, wherein the aluminum containing scavenger is represented by the formula $((R_z-Al-)_yO-)_x$, wherein z is 1-2, y is 1-2, x is 1-100 and R is a C1-C12 hydrocarbyl group.

21. The method of paragraph 20, wherein R is a C4-C10 hydrocarbyl group.

22. The method of paragraph 21, wherein R is a methyl group.

23. The method of paragraph 20, wherein R is t-butyl, z is 2, y is 2 and x is 1 or alumoxane.

24. The method of any of paragraphs 1 through 23, wherein the aluminum containing scavenger is present from about 1 to about 5000 equivalents to 1 pyridyldiamido transition metal catalyst equivalent.

25. The method of paragraph 24, wherein the aluminum containing scavenger is present from about 500 to 1000 equivalents to 1 pyridyldiamido transition metal catalyst equivalent.

26. The method of any of paragraphs 1 through 25, wherein the polyolefin has a molecular weight of from about 1000 Da to about 3,000,000 Da.

27. A pyridyldiamido transition metal catalyst represented by the formula (I) or (II):

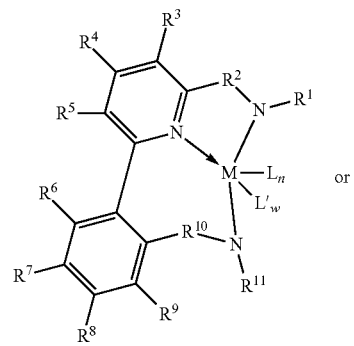

(I)

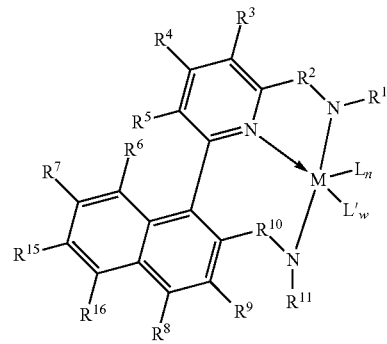

(II)

wherein:

M is a Group 3, 4, 5, 6, 7, 8, 9, 10, 11, or 12 metal;

$R^1$ is selected from the group consisting of hydrocarbyls, substituted hydrocarbyls, and silyl groups (preferably a phenyl group substituted at the 2 and 6 positions, preferably with the same or different C1-C20 alkyl groups);

$R^{11}$ is a phenyl group substituted at the 2 position, preferably with a C1-C20 alkyl group and which is not substituted at the 3, 5, and/or 6 positions provided that the 4 position can be substituted with a group 17 (preferably Cl, Br, F or I) element or a C1-C20 alkyl group;

$R^2$ and $R^{10}$ are each, independently, -E($R^{12}$)($R^{13}$)— with E being carbon, silicon, or germanium, and each $R^{12}$ and $R^{13}$ being independently selected from the group consisting of hydrogen, hydrocarbyls, and substituted hydrocarbyls, alkoxy, silyl, amino, aryloxy, halogen, and phosphino, $R^{12}$ and $R^{13}$ may be joined to form a saturated, substituted or unsubstituted hydrocarbyl ring, where the ring has 4, 5, 6, or 7 ring carbon atoms and where substitutions on the ring can join to form additional rings, or $R^{12}$ and $R^{13}$ may be joined to form a saturated heterocyclic ring, or a saturated substituted heterocyclic ring where substitutions on the ring can join to form additional rings;

$R^3$, $R^4$, and $R^5$ are independently selected from the group consisting of hydrogen, hydrocarbyls, substituted hydrocarbyls, alkoxy, aryloxy, halogen, amino, and silyl, and wherein adjacent R groups ($R^3$ & $R^4$ and/or $R^4$ & $R^5$) may be joined to form a substituted or unsubstituted hydrocarbyl or heterocyclic ring, where the ring has 5, 6, 7, or 8 ring atoms and where substitutions on the ring can join to form additional rings;

$R^6$, $R^7$, $R^8$, $R^9$, $R^{15}$, and $R^{16}$ are independently selected from the group consisting of hydrogen, hydrocarbyls, substituted hydrocarbyls, alkoxy, halogen, amino, and silyl, and wherein adjacent R groups ($R^6$ & $R^7$, and/or $R^7$ & $R^{15}$, and/or $R^{16}$ & $R^{15}$, and/or $R^8$ & $R^9$) may be joined to form a saturated, substituted or unsubstituted hydrocarbyl or heterocyclic ring, where the ring has 5, 6, 7, or 8 ring carbon atoms and where substitutions on the ring can join to form additional rings;

L is an anionic leaving group, where the L groups may be the same or different and any two L groups may be linked to form a dianionic leaving group;

n is 0, 1, 2, 3, or 4;

L' is neutral Lewis base;

w is 0, 1, 2, 3, or 4; and wherein n+w is no greater than 4.

28. The pyridyldiamido transition metal catalyst of paragraph 27, wherein M is Ti, Zr, or Hf.

29. The pyridyldiamido transition metal catalyst of either of paragraphs 27 or 28, wherein $R^6$, $R^7$, $R^8$, $R^9$, $R^{15}$, and $R^{16}$, are independently selected from the group consisting of hydrogen, hydrocarbyls, substituted hydrocarbyls, alkoxy, halogen, amino, and silyl.

30. The pyridyldiamido transition metal catalyst of any of paragraphs 27 through 29, wherein each L is independently selected from the group consisting of halide, alkyl, aryl, alkoxy, amido, hydrido, phenoxy, hydroxy, silyl, allyl, alkenyl, and alkynyl.

31. The pyridyldiamido transition metal catalyst of any of paragraphs 27 through 30, wherein each L' is independently selected from the group consisting of ethers, thio-ethers, amines, nitriles, imines, pyridines, and phosphines.

32. The pyridyldiamido transition metal catalyst of any of paragraphs 27 through 31, wherein the $R^2$ group(s) are selected from the group consisting of $CH_2$, $CMe_2$, $SiMe_2$, $SiEt_2$, $SiPr_2$, $SiBu_2$, $SiPh_2$, $Si(aryl)_2$, and $Si(alkyl)_2$, CH(aryl), CH(Ph), CH(alkyl), CH(2-isopropylphenyl), where alkyl is a $C_1$ to $C_{40}$ alkyl group, aryl is a $C_5$ to $C_{40}$ aryl group.

33. The pyridyldiamido transition metal catalyst of any of paragraphs 27 through 32, wherein the $R^{10}$ group(s) are selected from the group consisting of $CH_2$, $CMe_2$, $SiMe_2$, $SiEt_2$, $SiPr_2$, $SiBu_2$, $SiPh_2$, $Si(aryl)_2$, and $Si(alkyl)_2$, CH(aryl), CH(Ph), CH(alkyl), CH(2-isopropylphenyl), where alkyl is a $C_1$ to $C_{40}$ alkyl group, aryl is a $C_5$ to $C_{40}$ aryl group, and Ph is phenyl.

34. The pyridyldiamido transition metal catalyst of any of paragraphs 27 through 33, wherein $R^{11}$ is an ortho alkyl substituted phenyl group.

35. The pyridyldiamido transition metal catalyst of paragraph 34, wherein the ortho alkyl substituent is a methyl, ethyl, iso-propyl, propyl, butyl, or isobutyl group.

36. The pyridyldiamido transition metal catalyst of either of paragraphs 34 or 35, wherein the remaining positions of the phenyl group are hydrogen atoms or the 4 position is substituted by a halogen or a C1-C20 alkyl group.

37. A catalyst system comprising optionally an activator, an aluminum containing scavenger that has an oxygen to aluminum (O/Al) molar ratio from about 0.25 to about 1.5 and a pyridyldiamido transition metal complex represented by the formula (I) or (II):

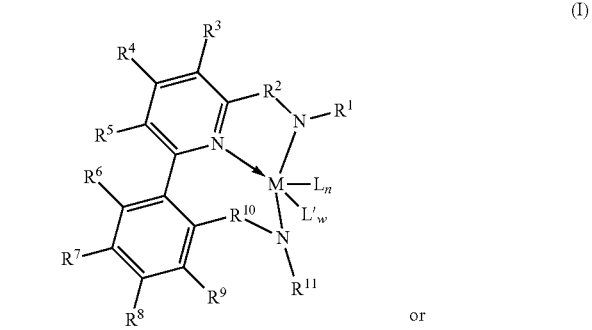

(I)

or

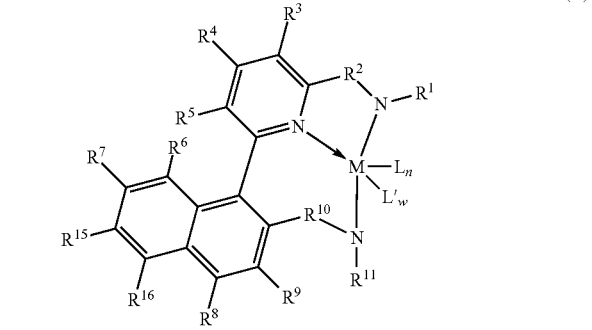

(II)

wherein:

M is a Group 3, 4, 5, 6, 7, 8, 9, 10, 11, or 12 metal;

$R^1$ and $R^{11}$ are each independently selected from the group consisting of hydrocarbyls, and substituted hydrocarbyls, or silyl groups;

$R^2$ and $R^{10}$ are each, independently, $-E(R^{12})(R^{13})-$ with E being carbon, silicon, or germanium, and each $R^{12}$ and $R^{13}$ being independently selected from the group consisting of hydrogen, hydrocarbyls, and substituted hydrocarbyls, alkoxy, silyl, amino, aryloxy, halogen, and phosphino, $R^{12}$ and $R^{13}$ may be joined to form a saturated, substituted or unsubstituted hydrocarbyl ring, where the ring has 4, 5, 6, or 7 ring carbon atoms and where substitutions on the ring can join to form additional rings, or $R^{12}$ and $R^{13}$ may be joined to form a saturated heterocyclic ring, or a saturated substituted heterocyclic ring where substitutions on the ring can join to form additional rings;

$R^3$, $R^4$, and $R^5$ are independently selected from the group consisting of hydrogen, hydrocarbyls, substituted hydrocarbyls, alkoxy, aryloxy, halogen, amino, and silyl, and wherein adjacent R groups ($R^3$ & $R^4$ and/or $R^4$ & $R^5$) may be joined to form a substituted or unsubstituted hydrocarbyl or heterocyclic ring, where the ring has 5, 6, 7, or 8 ring atoms and where substitutions on the ring can join to form additional rings;

$R^6$, $R^7$, $R^8$, $R^9$, $R^{15}$, and $R^{16}$ are independently selected from the group consisting of hydrogen, hydrocarbyls, substituted hydrocarbyls, alkoxy, halogen, amino, and silyl, and wherein adjacent R groups ($R^6$ & $R^7$, and/or $R^7$ & $R^{15}$, and/or $R^{16}$ & $R^{15}$, and/or $R^8$ & $R^9$) may be joined to form a saturated, substituted or unsubstituted hydrocarbyl or heterocyclic ring, where the ring has 5, 6, 7, or 8 ring carbon atoms and where substitutions on the ring can join to form additional rings;

L is an anionic leaving group, where the L groups may be the same or different and any two L groups may be linked to form a dianionic leaving group;

n is 0, 1, 2, 3, or 4;
L' is neutral Lewis base;
w is 0, 1, 2, 3, or 4; and
wherein n+w is no greater than 4.

38. The catalyst system of paragraph 37, wherein the optional activator is a non-coordinating anion.

39. The catalyst system of paragraph 37, wherein the optional activator is alumoxane.

40. The catalyst system of paragraph 37, wherein $R^{11}$ is a phenyl group substituted at the 2 position with a C1-C20 alkyl group.

41. The catalyst system of paragraph 38, wherein $R^1$ is a phenyl group substituted at the 2 and 6 position with the same or different C1-C20 alkyl groups.

42. The catalyst system of paragraph 38, where $R^{11}$ is a phenyl group substituted at the 2 position, preferably with a C1-C20 alkyl group and which is not substituted at the 3, 5, and/or 6 positions.

43. The catalyst system of paragraph 42, where the 4 position can be substituted with a group 17 element or a C1-C20 alkyl group.

EXAMPLES $^1$H NMR spectroscopic data were acquired at 250, 400, or 500 MHz using solutions prepared by dissolving approximately 10 mg of a sample in either $C_6D_6$, $CD_2Cl_2$, $CDCl_3$, or $D_8$-toluene. The chemical shifts ($\delta$) presented are relative to the residual protium in the deuterated solvent at 7.15, 5.32, 7.24, and 2.09 (methyl resonance) for $C_6D_6$, $CD_2Cl_2$, $CDCl_3$, and $D_8$-toluene, respectively. For purposes of the claims 500 Mz and $CD_2Cl_2$ are used.

Gel Permeation Chromatography (GPC)—Multiple Angle Light Scattering (MALLS)

Mw, Mn and Mw/Mn are determined by using a High Temperature Size Exclusion Chromatograph (Polymer Laboratories), equipped with three in-line detectors, a differential refractive index detector (DRI), a light scattering (LS) detector, and a viscometer. Experimental details, including detector calibration, are described in T. Sun, P. Brant, R. R. Chance, and W. W. Graessley, Macromolecules, Volume 34, Number 19, pp. 6812-6820, (2001) and references therein. Three Polymer Laboratories PLgel 10 µm Mixed-B LS columns are used. The nominal flow rate is 0.5 ml/min, and the nominal injection volume is 300 µL. The various transfer lines, columns, viscometer and differential refractometer (the DRI detector) are contained in an oven maintained at 145° C. Solvent for the experiment is prepared by dissolving 6 grams of butylated hydroxytoluene as an antioxidant in 4 liters of Aldrich reagent grade 1,2,4 trichlorobenzene (TCB). The TCB mixture is then filtered through a 0.1 µm Teflon filter. The TCB is then degassed with an online degasser before entering the Size Exclusion Chromatograph. Polymer solutions are prepared by placing dry polymer in a glass container, adding the desired amount of TCB, then heating the mixture at 160° C. with continuous shaking for about 2 hours. All quantities are measured gravimetrically. The TCB densities used to express the polymer concentration in mass/volume units are 1.463 g/ml at room temperature and 1.284 g/ml at 145° C. The injection concentration is from 0.5 to 2.0 mg/ml, with lower concentrations being used for higher molecular weight samples. Prior to running each sample, the DRI detector and the injector are purged. Flow rate in the apparatus is then increased to 0.5 ml/minute, and the DRI is allowed to stabilize for 8 to 9 hours before injecting the first sample. The LS laser is turned on at least 1 to 1.5 hours before running the samples. The concentration, c, at each point in the chromatogram is calculated from the baseline-subtracted DRI signal, IDRI, using the following equation:

$$c = K_{DRI} I_{DRI}/(dn/dc)$$

where $K_{DRI}$ is a constant determined by calibrating the DRI, and (dn/dc) is the refractive index increment for the system. The refractive index, n=1.500 for TCB at 145° C. and $\lambda$=690 nm. For purposes of this invention and the claims thereto (dn/dc)=0.1048 for propylene polymers, 0.0916 for butene polymers. Units on parameters throughout this description of the SEC method are such that concentration is expressed in g/cm$^3$, molecular weight is expressed in g/mole, and intrinsic viscosity is expressed in dL/g.

The LS detector is a Wyatt Technology High Temperature DAWN HELEOS. The molecular weight, M, at each point in the chromatogram is determined by analyzing the LS output using the Zimm model for static light scattering (M. B. Huglin, Light Scattering from Polymer Solutions, Academic Press, 1971):

$$\frac{K_o c}{\Delta R(\theta)} = \frac{1}{MP(\theta)} + 2A_2 c$$

Here, $\Delta R(\theta)$ is the measured excess Rayleigh scattering intensity at scattering angle $\theta$; c is the polymer concentration determined from the DRI analysis; $A_2$ is the second virial coefficient; for purposes of this invention $A_2$=0.0006 for propylene polymers; 0.0015 for butene polymers; (dn/dc)=0.1048 for propylene polymers; 0.0916 for butene polymers; $P(\theta)$ is the form factor for a monodisperse random coil; and $K_o$ is the optical constant for the system:

$$K_o = \frac{4\pi^2 n^2 (dn/dc)^2}{\lambda^4 N_A}$$

where $N_A$ is Avogadro's number, and (dn/dc) is the refractive index increment for the system. The refractive index, n=1.500 for TCB at 145° C. and $\lambda$=657 nm.

A high temperature Viscotek Corporation viscometer, which has four capillaries arranged in a Wheatstone bridge configuration with two pressure transducers, is used to determine specific viscosity. One transducer measures the total pressure drop across the detector, and the other, positioned between the two sides of the bridge, measures a differential pressure. The specific viscosity, $\eta_s$, for the solution flowing through the viscometer is calculated from their outputs. The intrinsic viscosity, [$\eta$], at each point in the chromatogram is calculated from the following equation:

$$\eta_s = c[\eta] + 0.3(c[\eta])^2$$

where c is concentration and was determined from the DRI output.

All molecular weights are weight average unless otherwise noted. All molecular weights are reported in g/mol unless otherwise noted.

The complexes used as catalyst components in polymerization examples are shown in FIG. 1. Complexes C1 and C2 and the intermediates 4c, 4d, 6c, and 6d (Scheme 1) were prepared as described in US2011/0301310A1 and US2012/0071616A1. All other pyridyldiamines and pyridyldiamide complexes were prepared using the general procedures described below.

General Synthesis of Pyridyl Diamines

Outlined in Scheme 1 is the general synthetic route that was used to prepare the pyridyldiamines used herein with the exception of those listed above. In the Scheme, pin is pinacolate (2,3-dimethylbutane-2,3-diolate), Me is methyl, Dipp is 2,6-diisopropylphenyl. A detailed procedure is presented for the preparation of pyridyldiamine 6a. The pyridyldiamines 6b, 6e, 6f, 6g, 6h, 6i, 6j were prepared and isolated analogously to 6a and only characterization data are presented.

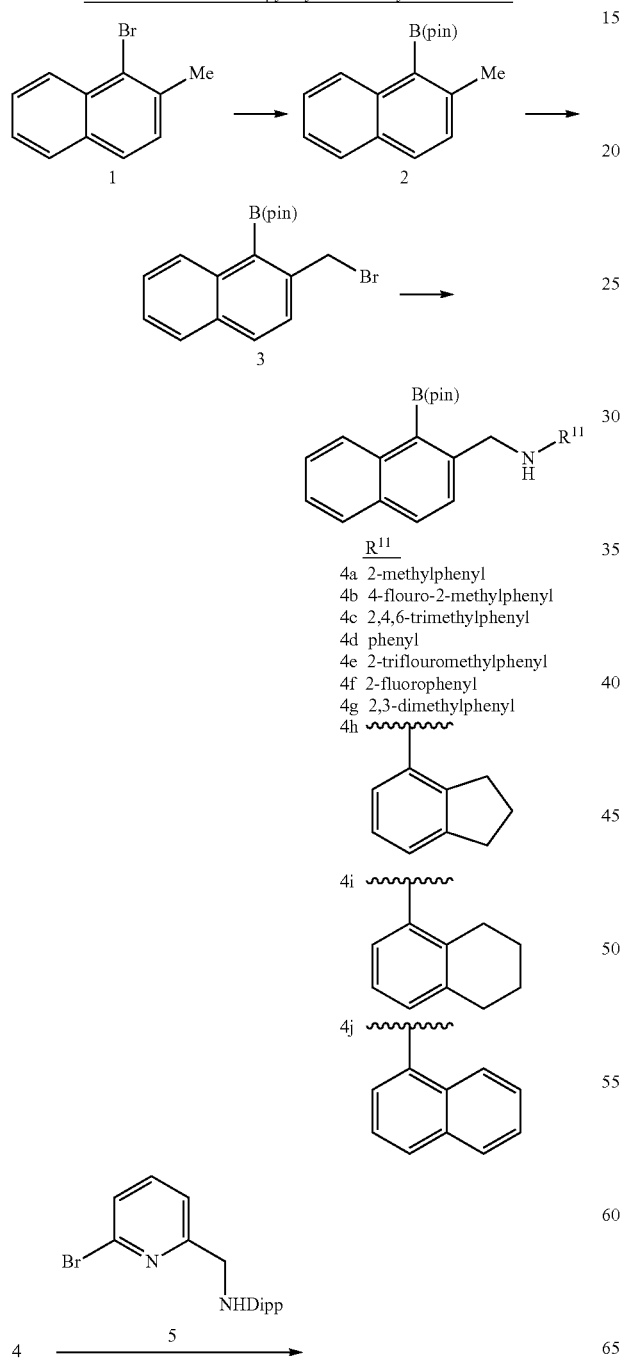

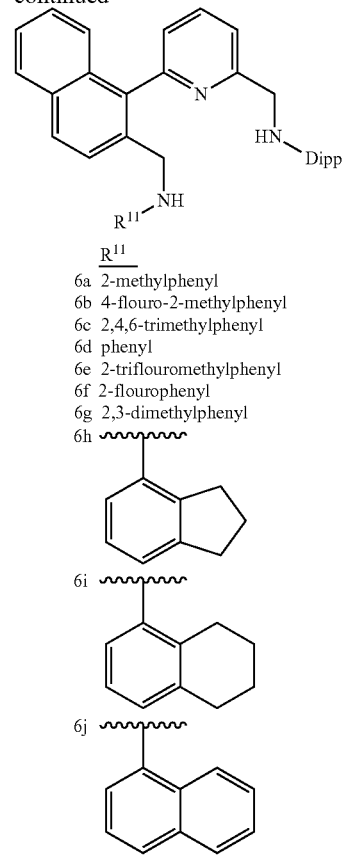

4,4,5,5-Tetramethyl-2-(2-methyl-1-naphthyl)-1,3,2-dioxaborolane (2)

1,2-Dibromoethane (~0.3 ml) was added to 6.10 g (250 mmol) magnesium turnings in 1000 cm³ of THF. This mixture was stirred for 10 min, and then 55.3 g (250 mmol) of 1-bromo-2-methylnaphthalene was added for 1 h by vigorous stirring at room temperature for 3.5 h. Thereafter, 46.5 g (250 mmol) of 2-isopropoxy-4,4,5,5-tetramethyl-1,3,2-dioxaborolane was added in one portion. The resulting mixture was stirred for 15 minutes and then was poured into 1000 cm³ of cold water. The product was extracted with 3×300 ml of ethyl acetate. The organic layer was separated, washed by water, brine, then dried over $MgSO_4$, and, finally, evaporated to dryness. The resulting white solid was washed by 2×75 ml of pentane and dried in vacuum. Yield 47.3 g (70%). Anal. calc. for $C_{17}H_{21}BO_2$: C, 76.14; H, 7.89. Found: C, 76.31; H, 8.02. $^1$H NMR ($CDCl_3$): 8.12 (m, 1H, 8-H), 7.77 (m, 1H, 5-H), 7.75 (d, J=8.4 Hz, 1H, 4-H), 7.44 (m, 1H, 7-H), 7.38 (m, 1H, 6-H), 7.28 (d, J=8.4 Hz, 1H, 3-H), 2.63 (s, 3H, 2-Me), 1.48 (s, 12H, $CMe_2CMe_2$).

2-[2-(Bromomethyl)-1-naphthyl]-4,4,5,5-tetramethyl-1,3,2-dioxaborolane (3)

A mixture of 47.3 g (176 mmol) of 4,4,5,5-tetramethyl-2-(2-methyl-1-naphthyl)-1,3,2-dioxaborolane, 33.0 g (185 mmol) of NBS (N-Bromosuccinimide) and 0.17 g of benzoyl peroxide in 340 ml of $CCl_4$ was stirred at 75° C. for 14 h. Thereafter the reaction mixture was cooled to room temperature, filtered through glass frit (G3), and the filtrate was evaporated to dryness. This procedure gave 62.2 g (99%) of beige solid. Anal. calc. for $C_{17}H_{20}BBrO_2$: C, 58.83; H, 5.81. Found: C, 59.00; H, 5.95. $^1$H NMR (CDCl$_3$): 8.30 (m, 1H, 8-H), 7.84 (d, J=8.3 Hz, 1H, 4-H), 7.79 (m, 1H, 5-H), 7.43-7.52 (m, 3H, 3,6,7-H), 4.96 (s, 2H, CH$_2$Br), 1.51 (s, 12H, CMe$_2$CMe$_2$).

2-Methyl-N-((1-(4,4,5,5-tetramethyl-1,3,2-dioxaborolan-2-yl)naphthalen-2-yl)methyl)aniline (4a)

A mixture of 10.8 g (101 mmol) of 2-methylaniline, 23.3 g (67.0 mmol) of 2-[2-(bromomethyl)-1-naphthyl]-4,4,5,5-tetramethyl-1,3,2-dioxaborolane (compound 3), and 10.2 g (74.0 mmol) of K$_2$CO$_3$ in 450 mL of DMF was stirred for 12 h at 80° C. The resulting mixture was poured into 1000 mL of water. The product was extracted with 3×200 ml of ethyl acetate. The combined extract was dried over MgSO$_4$ and then evaporated to dryness. The residue was re-crystallized from a mixture of 200 ml of hexane and 10 ml of ethyl acetate. Yield 15.7 g (63%) of a brown crystalline powder. Anal. calc. for $C_{24}H_{28}BNO_2$: C, 77.22; H, 7.56; N, 3.75. Found: C, 77.33; H, 7.67; N, 3.59. $^1$H NMR (CDCl$_3$): δ 8.20 (m, 1H, 8-H in naphthyl), 7.84 (d, J=8.5 Hz, 1H, 4-H in naphthyl), 7.82 (m, 1H, 5-H in naphthyl), 7.43-7.52 (m, 3H, 3,6,7-H in naphthyl), 7.14 (m, 1H, 5-H in o-tolyl), 7.06 (m, 1H, 3-H in o-tolyl), 6.79 (m, 1H, 6-H in o-tolyl), 6.68 (m, 1H, 4-H in o-tolyl), 4.53 (s, 2H, CH2N), 3.95 (br.s, 1H, NH), 2.11 (s, 3H, 2-Me in o-tolyl), 1.36 (s, 12H, CMe2CMe2).

N-[(6-Bromopyridin-2-yl)methyl]-2,6-diisopropylaniline (5)

A mixture of 25.0 g (134 mmol) of 6-bromopyridine-2-carbaldehyde, 23.8 g (134 mmol) of 2,6-diisopropylaniline and 1.15 g (6.70 mmol) of TsOH in 600 ml of toluene was refluxed for 15 min using a Soxhlet apparatus filled with CaCl$_2$. The obtained solution was evaporated to dryness, and the residue was re-crystallized from 100 ml of methanol to give the imine product N-[(1E)-(6-bromopyridin-2-yl)methylene]-2,6-diisopropylaniline as a yellow crystalline solid (23.9 g). In argon atmosphere, a mixture of 22.4 g (65.0 mmol) of N-[(1E)-(6-bromopyridin-2-yl)methylene]-2,6-diisopropylaniline, 6.53 g (104 mmol) of NaBH$_3$CN, 2 ml of AcOH and 430 ml of methanol was refluxed for 12 h. The obtained mixture was cooled, poured into 1000 ml of water, and then extracted with 3×200 ml of ethyl acetate. The combined extract was dried over MgSO$_4$ and evaporated to dryness. The residue was purified by flash chromatography on silica gel 60 (40-63 μm, eluent: hexane-ethyl acetate=10:1, vol.). Yield 19.8 g (43%) of a yellow oil. Anal. calc. for $C_{18}H_{23}BrN_2$: C, 62.25; H, 6.68; N, 8.07. Found: C, 62.40; H, 6.77; N, 7.96. $^1$H NMR (CDCl$_3$): δ 7.50 (m, 1H, 4-H in 6-bromopyridyl), 7.38 (m, 1H, 5-H in 6-bromopyridyl), 7.28 (m, 1H, 3-H in 6-bromopyridyl), 7.01-7.11 (m, 3H, 3,4,5-H in 2,6-diisopropylphenyl), 4.16 (s, 2H, CH$_2$N), 3.93 (br.s, 1H, NH), 3.31 (sep, J=6.9 Hz, 2H, CHMe$_2$), 1.22 (d, J=6.9 Hz, 12H, CHMe$_2$).

2,6-Diisopropyl-N-{[6-(2-{[(2-methylphenyl)amino] methyl}-1-naphthyl)pyridin-2-yl]methyl}aniline (6a)

A mixture of 27.2 g (95.0 mmol) of Na$_2$CO$_3$×10H$_2$O, 410 ml of water and 120 ml of methanol was purged with argon for 30 min. The obtained solution was added to a mixture of 14.2 g (38.0 mmol) of 2-methyl-N-{[1-(4,4,5,5-tetramethyl-1,3,2-dioxaborolan-2-yl)-2-naphthyl]methyl}aniline (4a), 13.3 g (38.0 mmol) of N-[(6-bromopyridin-2-yl)methyl]-2,6-diisopropylaniline, and 2.19 g (1.90 mmol) of Pd(PPh$_3$)$_4$ in 500 ml of toluene. This mixture was stirred for 12 h at 70° C., then cooled to room temperature. The organic layer was separated; the aqueous layer was extracted with 3×200 ml of ethyl acetate. The combined organic extract was washed with brine, dried over Na$_2$SO$_4$ and evaporated to dryness. The residue was purified by flash chromatography on silica gel 60 (40-63 μm, eluent: hexane-ethyl acetate-triethylamine=100:20:1, vol.). Yield 10.1 g (52%) of a yellow powder. Anal. calc. for $C_{36}H_{39}N_3$: C, 84.17; H, 7.65; N, 8.18. Found: C, 84.28; H, 7.73; N, 8.09. $^1$H NMR (CDCl$_3$): δ 7.91 (d, J=8.4 Hz, 1H, 4-H in naphthyl), 7.89 (m, 1H, 8-H in naphthyl), 7.79 (m, 1H, 4-H in Py), 7.66 (d, J=8.4 Hz, 1H, 3-H in naphthyl), 7.47 (m, 1H, 7-H in naphthyl), 7.36-7.42 (m, 4H, 3,5-H in Py and 5,6-H in naphthyl), 7.04-7.10 (m, 3H, 3,5-H in ortho-tolyl and 4-H in 2,6-diisopropylphenyl), 7.01 (m, 2H, 3,5-H in 2,6-diisopropylphenyl), 6.61 (m, 1H, 4-H in ortho-tolyl), 6.52 (m, 1H, 6-H in ortho-tolyl), 4.22-4.35 (m, 4H, CH$_2$N), 4.02 (br.s, 1H, NH), 3.93 (br.s, 1H, NH), 3.28 (sept, J=6.8 Hz, 2H, CHMe$_2$), 2.09 (s, 3H, Me in ortho-tolyl), 1.16 (d, J=6.8 Hz, 6H, CHMeMe'), 1.14 (d, J=6.8 Hz, 6H, CHMeMe').

N-{[1-(6-{[(2,6-Diisopropylphenyl)amino] methyl}pyridin-2-yl)-2-naphthyl]methyl}-4-fluoro-2-methylaniline (6b)

Anal. calc. for $C_{36}H_{38}FN_3$: C, 81.32; H, 7.20; N, 7.90. Found: C, 80.98; H, 7.14; N, 7.82.
$^1$H NMR (CDCl$_3$): δ 7.91 (d, J=8.5 Hz, 1H), 7.89 (m, 1H), 7.80 (m, 1H), 7.64 (d, J=8.5 Hz, 1H), 7.35-7.50 (m, 5H), 7.03-7.11 (m, 3H), 6.75 (m, 1H), 6.71 (m, 1H), 6.42 (dd, J=8.7 Hz, J=4.6 Hz, 1H), 4.28 (m, 2H), 4.20 (m, 2H), 3.97 (br.s, 1H), 3.89 (br.s, 1H), 3.26 (sept, J=6.8 Hz), 2.08 (s, 3H), 1.16 (d, J=6.9 Hz, 6H), 1.15 (d, J=6.9 Hz, 6H).

2,6-Diisopropyl-N-({6-[2-({[2-(trifluoromethyl)phenyl]amino}methyl)-1-naphthyl]pyridin-yl}methyl)aniline (6e)

Anal. calc. for $C_{36}H_{36}F_3N_3$: C, 76.17; H, 6.39; N, 7.40. Found: C, 75.92; H, 6.30; N, 7.24.
$^1$H NMR (CDCl$_3$): δ 7.92 (d, J=8.6 Hz, 1H), 7.89 (m, 1H), 7.82 (m, 1H), 7.64 (d, J=8.6 Hz, 1H), 7.36-7.51 (m, 6H), 7.24 (m, 1H), 7.04-7.12 (m, 3H), 6.68 (m, 1H), 6.64 (m, 1H), 4.80 (m, 1H), 4.26-4.39 (m, 4H), 4.11 (br.s, 1H), 3.31 (sept, J=6.75 Hz, 2H), 1.17 (d, J=6.8 Hz, 6H), 1.16 (d, J=6.8 Hz, 6H).

N-{[6-(2-{[(2-Fluorophenyl)amino]methyl}-1-naphthyl)pyridin-2-yl]methyl}-2,6-diisopropylaniline (6f)

Anal. calc. for $C_{35}H_{36}FN_3$: C, 81.20; H, 7.01; N, 8.12. Found: C, 80.98; H, 7.16; N, 8.30.
$^1$H NMR (CDCl$_3$): δ 7.91 (d, J=8.4 Hz, 1H), 7.89 (m, 1H), 7.81 (m, 1H), 7.67 (d, J=8.4 Hz, 1H), 7.45-7.50 (m, 2H), 7.35-7.42 (m, 3H), 7.04-7.12 (m, 3H), 6.87-6.95 (m, 2H), 6.54-6.64 (m, 2H), 4.40 (br.s, 2H), 4.31 (m, 2H), 4.27 (m, 2H), 3.30 (sept, J=6.8 Hz, 2H), 1.17 (d, J=6.8 Hz, 6H), 1.16 (d, J=6.8 Hz, 6H).

N-{[1-(6-{[(2,6-Diisopropylphenyl)amino] methyl}pyridin-2-yl)-2-naphthyl]methyl}-2,3-dimethylaniline (6g)

Anal. calc. for $C_{37}H_{41}N_3$: C, 84.21; H, 7.83; N, 7.96. Found: C, 84.37; H, 7.99; N, 7.89.
$^1$H NMR (CDCl$_3$): δ 7.91 (d, J=8.2 Hz, 1H, 4-H in naphthyl), 7.89 (m, 1H, 8-H in naphthyl), 7.79 (m, 1H, 4-H in Py), 7.67 (d, J=8.6 Hz, 1H, 3-H in naphthyl), 7.48 (m, 1H, 7-H in naphthyl), 7.37-7.45 (m, 4H, 3,5-H in Py and 5,6-H in naphthyl), 7.04-7.11 (m, 3H, 3,4,5-H in 2,6-diisopropylphenyl), 6.93 (m, 1H, 5-H in 2,3-dimethylphenyl), 6.56 (m, 1H, 4-H in 2,3-dimethylphenyl), 6.44 (m, 1H, 6-H in 2,3-dimethylphenyl), 4.23-4.36 (m, 4H, 2,3-dimethylphenyl-NHCH$_2$ and 2,6-diisopropylphenyl-NHCH$_2$), 4.02 (br.s, 1H, NH), 3.98 (br.s, 1H, NH), 3.29 (sept, J=6.8 Hz, 2H, CHMe$_2$), 2.24 (s, 3H, 3-Me in 2,3-dimethylphenyl), 2.01 (s, 3H, 2-Me in 2,3-dimethylphenyl), 1.17 (d, J=6.8 Hz, 6H, CHMeMe'), 1.15 (d, J=6.8 Hz, 6H, CHMeMe').

N-{[1-(6{[(2,6-Diisopropylphenyl)amino]methyl}pyridin-2-yl)-2-naphthyl]methyl}indan-4-amine (6h)

Anal. calc. for C$_{38}$H$_{41}$N$_3$: C, 84.56; H, 7.66; N, 7.79. Found: C, 84.49; H, 7.75; N, 7.62.

$^1$H NMR (CDCl$_3$): δ 7.90 (d, J=8.5 Hz, 1H, 4-H in naphthyl), 7.88 (m, 1H, 8-H in naphthyl), 7.79 (m, 1H, 4-H in Py), 7.67 (d, J=8.5 Hz, 1H, 3-H in naphthyl), 7.35-7.49 (m, 5H, 3,5-H in Py and 5,6,7-H in naphthyl), 7.03-7.10 (m, 3H, 3,4,5-H in 2,6-diisopropylphenyl), 6.97 (m, 1H, 3-H in indanyl), 6.60 (m, 1H, 4-H in indanyl), 6.35 (m, 1H, 2-H in indanyl), 4.21-4.36 (m, 4H, indanyl-NHCH$_2$ and 2,6-diisopropylphenyl-NHCH$_2$), 4.04 (br.s, 1H, NH), 3.88 (br.s, 1H, NH), 3.28 (sept, J=6.8 Hz, 2H, CHMe$_2$), 2.86 (m, 2H, 5,5'-H in indanyl), 2.62 (m, 2H, 7,7'-H in indanyl), 2.03 (m, 2H, 6,6'-H in indanyl), 1.15 (d, J=6.8 Hz, 6H, CHMeMe'), 1.14 (d, J=6.8 Hz, 6H, CHMeMe').

N-{[1-(6-{[(2,6-Diisopropylphenyl)amino]methyl}pyridin-2-yl)-2-naphthyl]methyl}-5,6,7,8-tetrahydronaphthalen-1-amine (6i)

Anal. calc. for C$_{39}$H$_{43}$N$_3$: C, 84.59; H, 7.83; N, 7.59. Found: C, 84.44; H, 7.69; N, 7.65.

$^1$H NMR (CDCl$_3$): δ 7.90 (d, J=8.4 Hz, 1H, 4-H in naphthyl), 7.88 (m, 1H, 8-H in naphthyl), 7.78 (m, 1H, 4-H in Py), 7.66 (d, J=8.4 Hz, 1H, 3-H in naphthyl), 7.36-7.49 (m, 5H, 3,5-H in Py and 5,6,7-H in naphthyl), 7.02-7.10 (m, 3H, 3,4,5-H in 2,6-diisopropylphenyl), 6.93 (m, 1H, 3-H in tetrahydronaphthyl), 6.46 (m, 1H, 4-H in tetrahydronaphthyl), 6.37 (m, 1H, 2-H in tetrahydronaphthyl), 4.22-4.36 (m, 4H, tetrahydronaphthyl-NHCH$_2$ and 2,6-diisopropylphenyl-NHCH$_2$), 4.06 (br.s, 1H, NH), 3.91 (br.s, 1H, NH), 3.28 (sept, J=6.7 Hz, 2H, CHMe$_2$), 2.70 (m, 2H, 5,5'-H in tetrahydronaphthyl), 2.36 (m, 2H, 8,8'-H in tetrahydronaphthyl), 1.79 (m, 2H, 7,7'-H in tetrahydronaphthyl), 1.70 (m, 2H, 6,6'-H in tetrahydronaphthyl), 1.15 (d, J=6.7 Hz, 6H, CHMeMe'), 1.14 (d, J=6.7 Hz, 6H, CHMeMe').

N-{[1-(6-{[(2,6-Diisopropylphenyl)amino]methyl}pyridin-2-yl)-2-naphthyl]methyl}naphthalen-1-amine (6j)

Anal. calc. for C$_{39}$H$_{39}$N$_3$: C, 85.21; H, 7.15; N, 7.64. Found: C, 85.36; H, 7.32; N, 7.42.

$^1$H NMR (CDCl$_3$): δ 7.92 (d, J=8.4 Hz, 1H, 4-H in naphthylidene), 7.90 (m, 1H, 8-H in naphthylidene), 7.70-7.78 (m, 4H, 4-H in Py and 3,5-H in naphthylidene and 8-H in naphthyl), 7.17-7.51 (m, 9H, 3,5-H in Py and 6,7-H in naphthylidene and 3,4,5,6,7-H in naphthyl), 7.01-7.08 (m, 3H, 3,4,5-H in 2,6-diisopropylphenyl), 6.53 (m, 1H, 2-H in naphthyl), 4.91 (br.s, 1H, NH), 4.38 (m, 2H, CH$_2$NH-2,6-diisopropylphenyl), 4.23 (m, 2H, CH$_2$NH-naphthyl), 3.99 (br.s, 1H, NH), 3.23 (sept, J=6.7 Hz, 2H, CHMe$_2$), 1.13 (d, J=6.7 Hz, 6H, CHMeMe'), 1.10 (d, J=6.7 Hz, 6H, CHMeMe').

Synthesis of Pyridyl Diamide Metal Complexes

Figure 2:
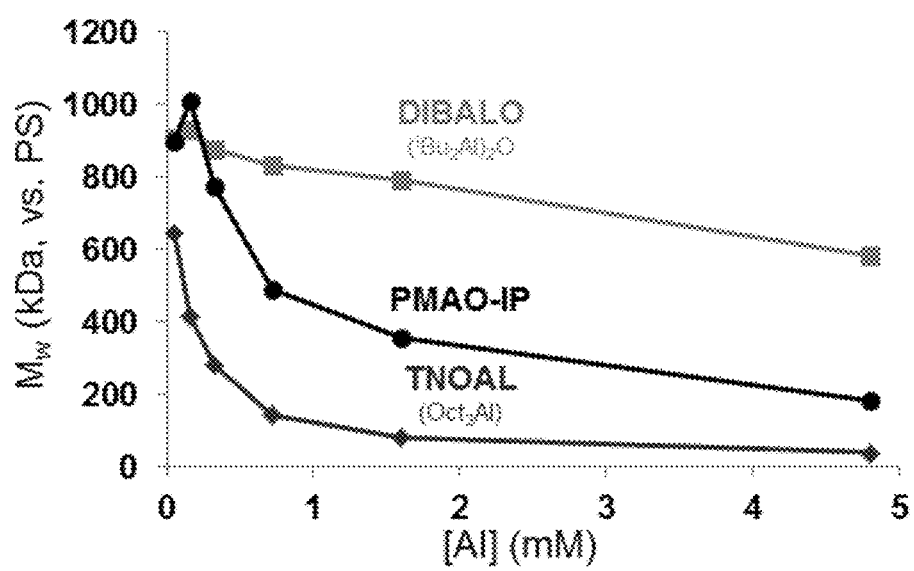
FIG. 2 is a plot showing the effect of scavenger concentration on weight-average molecular weight of polypropylene produced at 85° C. using complex C1 (Table 1 in examples) and [PhNHMe$_2$]B(C$_6$F$_5$)$_4$ catalyst system.

Shown below in Scheme 2 and also in FIG. 2 are pyridyldiamide complexes and an outline of the general synthetic route used to prepare them. A detailed synthesis is presented for complex A1. All other complexes were prepared analogously to complex A1.

Scheme 2. Synthesis of pyridyldiamide complexes

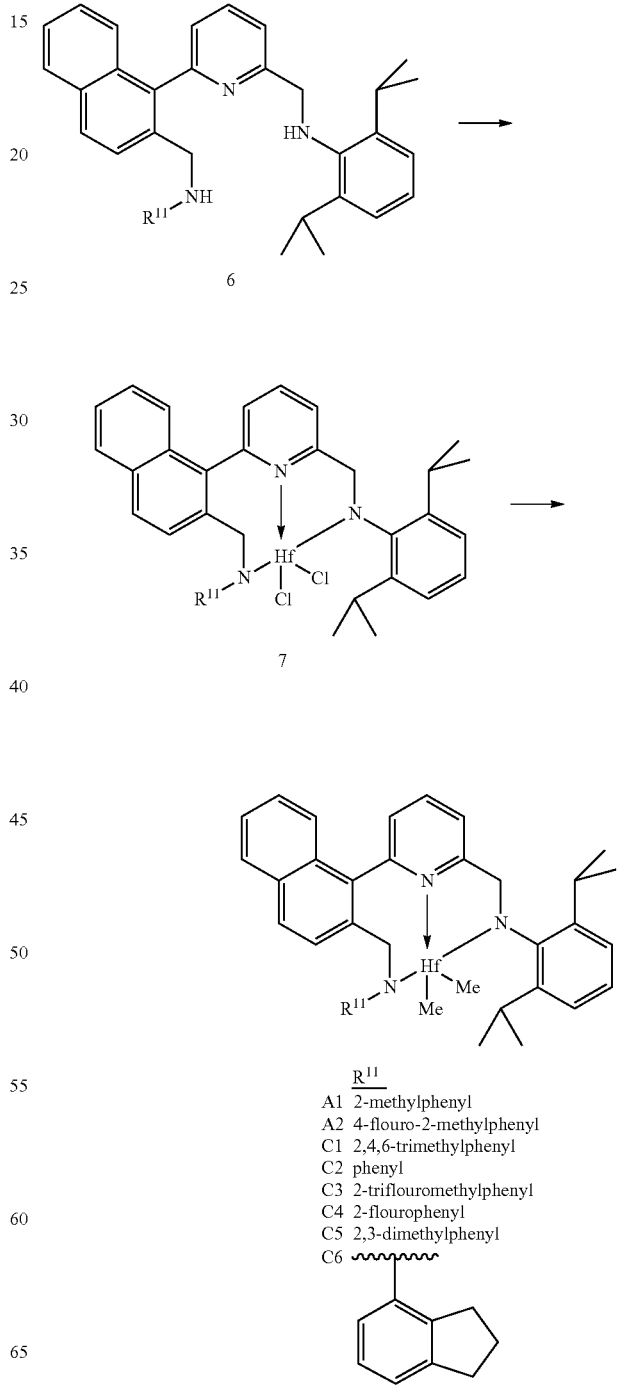

| | R$^{11}$ |
|---|---|
| A1 | 2-methylphenyl |
| A2 | 4-flouro-2-methylphenyl |
| C1 | 2,4,6-trimethylphenyl |
| C2 | phenyl |
| C3 | 2-triflouromethylphenyl |
| C4 | 2-flourophenyl |
| C5 | 2,3-dimethylphenyl |
| C6 | (indanyl) |

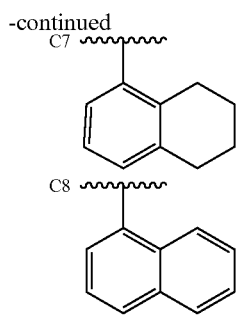

Complex A1.

Toluene (50 mL) was added to the pyridyldiamine 6a (2.07 g, 4.03 mmol) and Hf(NMe$_2$)$_2$Cl$_2$(dme) (dme=1,2-dimethoxyethane) (1.73 g, 4.03 mmol) to form a yellow solution. The mixture was heated to 95° C. in the dark. After 2.5 hours the suspension was cooled to ambient temperature for a couple of hours. The resulting solid was collected on a glass frit and washed with toluene (2×5 mL) and then dried under reduced pressure to afford 2.4 grams of the intermediate dichloride derivative as a white solid. Proton NMR spectroscopy indicated the presence of 0.46 equivalents of toluene. This dichloride derivative (2.40 g, 2.99 mmol) was combined with CH$_2$Cl$_2$ (100 mL) and cooled to −40° C. A solution of Me$_2$Mg (15.3 mL, 3.59 mmol) in Et$_2$O was added dropwise. After 0.5 h the mixture was allowed to warm to ambient temperature. The volatiles were then evaporated and the residue was extracted with CH$_2$Cl$_2$ and filtered. The volatiles were removed to afford the crude product that was washed with pentane. Drying under reduced pressure afforded product as a white solid (2.01 g, 93.3%). $^1$H NMR (400 MHz, CD$_2$Cl$_2$): 8.2-6.9 (aryls, 16H), 5.07 (AB quartet, Δυ=130 Hz, J=20 Hz), 4.49 (br, 1H), 4.14 (br, 1H), 3.74 (sept, 1H), 3.02 (br sept 1H), 2.30 (br, 3H), 1.4-1.0 (m, 11H), 0.89 (t, 2H), 0.55 (d, 3H), −0.80 (s, 3H), −1.13 (s, 3H).

Complex A2.

$^1$H NMR (500 MHz, CD$_2$Cl$_2$): 8.09 (br, 2H), 7.97 (d, 1H), 7.75-7.48 (m, 6H), 7.1-6.94 (m, 5H), 6.78 (br, 1H), 5.20 (d, 1H), 4.90 (br d, 1H), 4.5-3.7 (v br, 2H), 3.73 (sept, 1H), 3.1-1.8 (v br, 3H), 1.17 (d, 6H), 1.09 (d, 3H), 0.63 (br s, 3H), −0.80 (s, 3H), −1.14 (br s, 3H).

Complex C3.

NMR characterization data is broad and complex.

Complex C4.

$^1$H NMR (400 MHz, CD$_2$Cl$_2$): 8.2-6.9 (m, 15H), 5.03 (AB quartet, 2H), 4.42 (AB quartet, 2H), 3.74 (sept, 1H), 3.07 (sept, 1H), 1.15 (m, 9H), 0.62 (d, 3H), −0.65 (s, 3H), −1.09 (s, 3H).

Complex C5.

Proton NMR data is complex and broad and suggests the presence of multiple rotational isomers.

Complex C6.

$^1$H NMR (400 MHz, CD$_2$Cl$_2$): 8.2-7.5 (m, 9H), 7.1-6.7 (m, 6H), 5.01 (AB quartet, 2H), 4.38 (AB quartet, 2H), 3.73 (sept, 1H), 2.9 (m, 4H), 2.6 (m, 1H), 2.01 (m, 2H), 1.16 (d, 3H), 1.10 (m, 6H), 0.51 (d, 3H), −0.70 (s, 3H), −1.14 (s, 3H).

Complex C7.

Proton NMR data is complex and broad and suggests the presence of multiple rotational isomers.

Complex C8.

Proton NMR data is complex and broad and suggests the presence of multiple rotational isomers.

Polymerizations Examples

General Polymerization Procedures for Parallel Pressure Reactor

Both propylene homopolymerizations and ethylene-propylene copolymerizations were carried out in a parallel pressure reactor, as generally described in U.S. Pat. No. 6,306,658; U.S. Pat. No. 6,455,316; U.S. Pat. No. 6,489,168; WO 00/09255; and Murphy et al., J. Am. Chem. Soc., 2003,125, pp. 4306-4317, each of which is fully incorporated herein by reference for US purposes. Although the specific quantities, temperatures, solvents, reactants, reactant ratios, pressures, and other variables are frequently changed from one polymerization run to the next, the following describes a typical polymerization performed in a parallel pressure reactor.

A pre-weighed glass vial insert and disposable stirring paddle were fitted to each reaction vessel of the reactor, which contains 48 individual reaction vessels. The reactor was then closed and propylene (typically 1 mL) was introduced to each vessel as a condensed gas liquid. If ethylene was added as a comonomer, it was added before the propylene as a gas to a pre-determined pressure (typically 10-80 psi) while the reactor vessels were heated to a set temperature (typically 40° C.). Then solvent (typically isohexane) was added to bring the total reaction volume, including the subsequent additions, to 5 mL and the reactor vessels were heated to their set temperature (usually between 50° C. and 110° C.). At this time scavenger and/or co-catalyst and/or a chain transfer agent, such as tri-n-octylaluminum in toluene or bis(diisobutylaluminum) oxide in hexane (typically 100-1000 nmol) was added.

The contents of the vessel were stirred at 800 rpm. An activator solution (typically 1.0-1.2 molar equivalents of dimethyl anilinium tetrakis-pentafluorophenyl borate dissolved in toluene or 100-1000 molar equivalents of methyl alumoxane (MAO) in toluene) was then injected into the reaction vessel along with 500 microliters of toluene, followed by a toluene solution of catalyst (typically 0.40 mM in toluene, usually 20-40 nanomols of catalyst) and another aliquot of toluene (500 microliters). Equivalence is determined based on the mol equivalents relative to the moles of the transition metal in the catalyst complex.

The reaction was then allowed to proceed until a pre-determined amount of pressure had been taken up by the reaction. Alternatively, the reaction may be allowed to proceed for a set amount of time. At this point, the reaction was quenched by pressurizing the vessel with compressed air. After the polymerization reaction, the glass vial insert containing the polymer product and solvent was removed from the pressure cell and the inert atmosphere glove box, and the volatile components were removed using a Genevac HT-12 centrifuge and Genevac VC3000D vacuum evaporator operating at elevated temperature and reduced pressure. The vial was then weighed to determine the yield of the polymer product. The resultant polymer was analyzed by Rapid GPC (see below) to determine the molecular weight, by FT-IR (see below) to determine percent ethylene incorporation, and by DSC (see below) to determine melting point.

To determine various molecular weight related values by GPC, high temperature size exclusion chromatography was performed using an automated "Rapid GPC" system as generally described in U.S. Pat. No. 6,491,816; U.S. Pat. No. 6,491,823; U.S. Pat. No. 6,475,391; U.S. Pat. No. 6,461,515; U.S. Pat. No. 6,436,292; U.S. Pat. No. 6,406,632; U.S. Pat. No. 6,175,409; U.S. Pat. No. 6,454,947; U.S. Pat. No. 6,260,407; and U.S. Pat. No. 6,294,388; each of which is fully incorporated herein by reference for US purposes. This apparatus has a series of three 30 cm×7.5 mm linear columns, each containing PLgel 10 μm, Mix B. The GPC system was calibrated using polystyrene standards ranging from 580-3,390,000 g/mol. The system was operated at an eluent flow rate of 2.0 mL/minutes and an oven temperature of 165° C. 1,2,4-trichlorobenzene was used as the eluent. The polymer samples were dissolved in 1,2,4-trichlorobenzene at a concentration of 0.1-0.9 mg/mL. 250 uL of a polymer solution was injected into the system. The concentration of the polymer in the eluent was monitored using an evaporative light scattering detector. The molecular weights presented are relative to linear polystyrene standards and are uncorrected.

Differential Scanning calorimetry (DSC) measurements were performed on a TA-Q100 instrument to determine the melting point of the polymers. Samples were pre-annealed at 220° C. for 15 minutes and then allowed to cool to room temperature overnight. The samples were then heated to 220° C. at a rate of 100° C./minutes and then cooled at a rate of 50° C./min. Melting points were collected during the heating period. The weight percent of ethylene incorporated in the ethylene-propylene copolymers was determined by rapid FT-IR spectroscopy on a Bruker Equinox 55+ IR in reflection mode. Samples were prepared in a thin film format by evaporative deposition techniques. Weight percent ethylene was obtained from the ratio of peak heights at 744-715 and 1189-1126 cm$^{-1}$. This method was calibrated using a set of ethylene/propylene copolymers with a range of known wt % ethylene content.

Comparison of A1 Scavenger Effect on Molecular Weight or Polypropylene

The homopolymerization of propylene was performed in a parallel pressure reactor using a catalyst system consisting of complex C1 and [PhNHMe$_2$]B(C$_6$F$_5$)$_4$ activator. The choice of scavenger was found to have a large effect on molecular weight of the resulting polymer. Over all concentration ranges explored bis(diisobutylaluminum)oxide (DIBALO) and PMAO-IP™ (a polymethylaluminoxane available from AkzoNobel, Pasadena, Tex.) scavengers yielded higher molecular weight polymer relative to Oct$_3$Al scavenger. Overall, DIBALO gave the best results with the least reduction in molecular weight, even at high concentrations of scavenger. These data are presented in FIG. 2.

Comparison of Catalyst Reactivity

Effect of Substitution at R$^{11}$ Position on Propylene Homopolymerization

The effect of substitution at the R11 (Formula I) position on propylene polymerization can be determined by comparing the performance of complexes A1 (R11=2-methylphenyl) and A2 (R=4-fluoro-2-methylphenyl) to those of comparatives C1 through C8 when all complexes have been activated under identical conditions. These experiments were performed and the results are shown in Table 2. Catalysts mixtures formed with A1 and A2 were found to be significantly more active for propylene polymerization at both 85 and 100° C. than related catalysts formed from complexes C1 through C8 (see Table 1). This indicates a preferred structure for the R$^{11}$ group, which is a single ortho substitution, preferably by a methyl group, with additional optional substitution at the 4 position. The use of an R$^{11}$ group that contains no substitution (e.g. C2), 2,6-disubstitution (e.g. C1), ortho substitution by a fluorocarbon group (e.g. C3), ortho substitution by a halogen (e.g. C4), or 2,3-disubstitution with (e.g. C6-C8) or without (e.g. C5) ring formation all gave relatively poor activities.

TABLE 1

Effect of substitution at R$^{11}$ position on propylene polymerization. Conditions: isohexane solvent, propylene added = 1 mL, total volume = 5 mL, complex = 30-40 nmol, N,N-dimethylanilinium tetrakis(pentafluorophenyl)borate activator (1.1 equivalents relative to complex), tri-n-octylaluminum (300 nmol). Activities are given as kilograms of PP/mmol of Hf/hour. Complexes marked with an asterisk (*) are comparative examples.

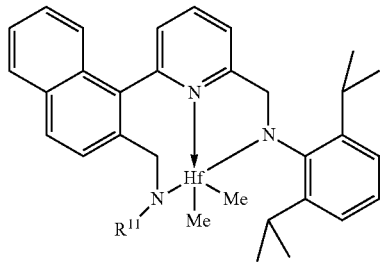

| Complex | R$^{11}$ | Activity at 85° C. | Activity at 100° C. |
|---|---|---|---|
| A1 | 2-methylphenyl | 187 | 61 |
| A2 | 4-fluoro-2-methylphenyl | 171 | 63 |
| C1* | 2,4,6-trimethylphenyl | 68 | 13 |
| C2* | Phenyl | 20 | 4 |
| C3* | 2-trifluoromethylphenyl | <1 | <1 |
| C4* | 2-fluorophenyl | <1 | <1 |
| C5* | 2,3-dimethylphenyl | 86 | 9 |
| C6* | 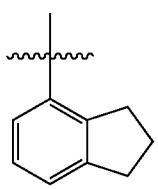 [SMILES: *c1cccc2c1CCC2] | 15 | 3 |

TABLE 1-continued

| | | |
|---|---|---|
| C7* (tetrahydronaphthalene structure) | 2 | 1 |
| C8* (naphthalene structure) | <1 | <1 |

Ethylene-Propylene Copolymerization in a Continuous Reactor

All of the examples were produced in a 0.5-liter continuous stirred-tank reactor operated in a solution process. The autoclave reactor was equipped with a stirrer, a water-cooling/steam-heating element with a temperature controller, and a pressure controller. Solvents and monomers were first purified by passing through a three-column purification system. Purification columns were regenerated periodically whenever there was evidence of lower activity of polymerization.

Isohexane was used as a solvent. The solvent was fed into the reactor using a Pulsa pump and its flow rate was controlled by a mass flow controller. Ethylene was delivered as a gas solubilized in the chilled solvent/monomer mixture. The compressed, liquefied propylene feed was controlled by a mass flow controller. The solvent and monomer were fed into a manifold first. The mixture of solvent and monomers were then chilled to about −15° C. by passing through a chiller prior to feeding into the reactor through a single tube. The collected samples were first air-dried in a hood to evaporate most of the solvent and unreacted monomers, and then dried in a vacuum oven at a temperature of about 90° C. for about 12 hours. The vacuum oven dried samples were weighed to obtain yields. Ethylene and propylene conversion was calculated basing on the polymer yield, composition and the amount of monomers fed into the reactor. Catalyst activity (also referred as to catalyst productivity) was calculated based the yield and the feed rate of catalyst (catalyst only). All the reactions were carried out at a gauge pressure of about 2.4 MPa.

Catalyst used in the following examples was complex A1 and N,N-dimethylanilinium tetrakis(pentafluorophenyl)borate. Both the complex A and activator were first dissolved in toluene and the solutions were kept in an inert atmosphere. The solutions of complex A1 and activator were fed into the reactor using a separated ISCO syringe pump. The activator feed rate were adjusted according the catalyst feed rate so the molar ratio of catalyst to activator was about 1:1. Both tri-n-octylaluminum (TNOAL) solution (available from Sigma Aldrich, Milwaukee, Wis.) and bis(diisobutylaluminium)oxide solution (available from Akzo Nobel) were further diluted in isohexane and used as a scavenger. The detailed process condition and some analytical results are summarized in Table 3.

TABLE 3

| | Run 1 | Run 2 |
|---|---|---|
| Polymerization temperature (° C.) | 85 | 85 |
| Propylene feed rate (g/min) | 14 | 14 |
| Ethylene feed rate (SLPM) | 0.7 | 0.7 |
| Isohexane feed rate (g/min) | 55.5 | 55.5 |
| Catalyst feed rate (mol/min) | 2.445E−07 | 2.445E−07 |
| Scavenger | TNOAL (25 wt % in hexane) | bis(diisobutylaluminum oxide) 20 wt % in hexane |
| Scavenger feed rate (mol/min) | 4.13E−06 | 4.12E−06 |
| Polymer yield (gram/min) | 6.16 | 5.98 |
| Mn_LS (g/mol) | 495,459 | 808,487 |
| Mw_LS (g/mol) | 1,250,617 | 1,699,686 |
| Mz_LS (g/mol) | 1,958,911 | 4,877,757 |
| Ethylene content (wt %) | 13.9 | 14.6 |

By comparing run 1 to run 2 (Table 3), the use of bis(diisobutylaluminum)oxide in place of tri-n-octylaluminum as scavenger yields product with significantly higher molecular weight.

The weight percent of ethylene in the product was determined by NMR spectroscopy as described by Cheung in J. Poly. Sci. Part B 1987, 25, p. 2355. Molecular weights were determined by GPC-MALLS as described earlier.

All documents described herein are incorporated by reference herein, including any priority documents and/or testing procedures to the extent they are not inconsistent with this text, provided however that any priority document not named in the initially filed application or filing documents is NOT incorporated by reference herein. As is apparent from the foregoing general description and the specific embodiments, while forms of the invention have been illustrated and described, various modifications can be made without departing from the spirit and scope of the invention. Accordingly, it is not intended that the invention be limited thereby. Likewise, the term "comprising" is considered synonymous with the term "including" for purposes of Australian law. Likewise, whenever a composition, an element, or a group of elements is preceded with the transitional phrase "comprising", it is understood that we also contemplate the same composition or group of elements with transitional phrases "consisting essentially of," "consisting of", "selected from the group of consisting of," or "is" preceding the recitation of the composition, element, or elements and vice versa.

What is claimed is:

1. A method to prepare a polyolefin comprising the step: contacting an olefinic monomer or olefinic monomers with a pyridyldiamido transition metal catalyst, optionally an activator, and dialkyl aluminum oxide scavenger.

2. The method of claim 1, wherein the olefinic monomers are one or more of ethylene, a propylene, a butylene, a hexene or an octene.

3. The method of claim 1, wherein the olefinic monomer is ethylene or propylene.

4. The method of claim 1, wherein the olefinic monomers are propylene and ethylene.

5. The method of claim 1, further comprising a trialkyl aluminum compound present in a concentration of from about 1 micromolar to about 50 micromolar.

6. The method of claim 1, wherein the activator is a non-coordinating anion activator.

7. The method of claim 6, wherein the non-coordinating activator is one or more of N,N'-dimethylanilinium tetrakis(pentafluorophenyl)borate, N,N-dimethylanilinium tetrakis(perfluoronaphthyl)borate, N,N-dimethylanilinium tetrakis(perfluorobiphenyl)borate, N,N-dimethylanilinium tetrakis(3,5-bis(trifluoromethyl)phenyl)borate, triphenylcarbenium tetrakis(perfluoronaphthyl)borate, triphenylcarbenium tetrakis(perfluorobiphenyl)borate, triphenylcarbenium tetrakis(3,5-bis(trifluoromethyl)phenyl)borate, or triphenylcarbenium tetrakis(perfluorophenyl)borate.

8. The method of claim 1, wherein activator is present from about 0.1 molar equivalents to about 10 molar equivalents, based on the transition metal catalyst.

9. The method of claim 1, wherein the pyridyldiamido transition metal catalyst is represented by the formula (I) or (II):

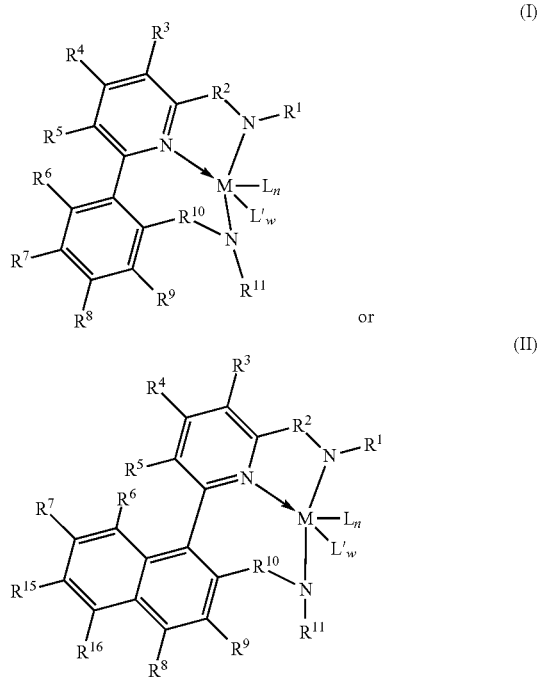

wherein:

M is a Group 3, 4, 5, 6, 7, 8, 9, 10, 11, or 12 metal;

$R^1$ and $R^{11}$ are each independently selected from the group consisting of hydrocarbyls, substituted hydrocarbyls, and silyl groups;

$R^2$ and $R^{10}$ are each, independently, $-E(R^{12})(R^{13})-$ with E being carbon, silicon, or germanium, and each $R^{12}$ and $R^{13}$ being independently selected from the group consisting of hydrogen, hydrocarbyls, substituted hydrocarbyls, alkoxy, silyl, amino, aryloxy, halogen, and phosphino, $R^{12}$ and $R^{13}$ may be joined to form a saturated, substituted or unsubstituted hydrocarbyl ring, where the ring has 4, 5, 6, or 7 ring carbon atoms and where substitutions on the ring can join to form additional rings, or $R^{12}$ and $R^{13}$ may be joined to form a saturated heterocyclic ring, or a saturated substituted heterocyclic ring where substitutions on the ring can join to form additional rings;

$R^3$, $R^4$, and $R^5$ are independently selected from the group consisting of hydrogen, hydrocarbyls, substituted hydrocarbyls, alkoxy, aryloxy, halogen, amino, and silyl, and wherein adjacent R groups ($R^3$ & $R^4$ and/or $R^4$ & $R^5$) may be joined to form a substituted or unsubstituted hydrocarbyl or heterocyclic ring, where the ring has 5, 6, 7, or 8 ring atoms and where substitutions on the ring can join to form additional rings;

$R^6$, $R^7$, $R^8$, $R^9$, $R^{15}$, and $R^{16}$ are independently selected from the group consisting of hydrogen, hydrocarbyls, substituted hydrocarbyls, alkoxy, halogen, amino, and silyl, and wherein adjacent R groups ($R^6$ & $R^7$, and/or $R^7$ & $R^{15}$, and/or $R^{16}$ & $R^{15}$, and/or $R^8$ & $R^9$) may be joined to form a saturated, substituted or unsubstituted hydrocarbyl or heterocyclic ring, where the ring has 5, 6, 7, or 8 ring carbon atoms and where substitutions on the ring can join to form additional rings;

L is an anionic leaving group, where the L groups may be the same or different and any two L groups may be linked to form a dianionic leaving group;

n is 0, 1, 2, 3, or 4;

L' is neutral Lewis base;

w is 0, 1, 2, 3, or 4; and wherein n+w is no greater than 4.

10. The method of claim 9, wherein M is Ti, Zr, or Hf;

$R^6$, $R^7$, $R^8$, $R^9$, $R^{15}$, and $R^{16}$, are independently selected from the group consisting of hydrogen, hydrocarbyls, substituted hydrocarbyls, alkoxy, halogen, amino, and silyl;

each L is independently selected from the group consisting of halide, alkyl, aryl, alkoxy, amido, hydrido, phenoxy, hydroxy, silyl, allyl, alkenyl, and alkynyl;

each L' is independently selected from the group consisting of ethers, thio-ethers, amines, nitriles, imines, pyridines, and phosphines;

the $R^2$ group(s) are selected from the group consisting of $CH_2$, $CMe_2$, $SiMe_2$, $SiEt_2$, $SiPr_2$, $SiBu_2$, $SiPh_2$, $Si(aryl)_2$, and $Si(alkyl)_2$, $CH(aryl)$, $CH(Ph)$, $CH(alkyl)$, $CH(2-isopropylphenyl)$, where alkyl is a $C_1$ to $C_{40}$ alkyl group, aryl is a $C_5$ to $C_{40}$ aryl group; and/or the $R^{10}$ group(s) are selected from the group consisting of $CH_2$, $CMe_2$, $SiMe_2$, $SiEt_2$, $SiPr_2$, $SiBu_2$, $SiPh_2$, $Si(aryl)_2$, and $Si(alkyl)_2$, $CH(aryl)$, $CH(Ph)$, $CH(alkyl)$, $CH(2-isopropylphenyl)$, where alkyl is a $C_1$ to $C_{40}$ alkyl group, aryl is a $C_5$ to $C_{40}$ aryl group, and Ph is phenyl.

11. The method of claim 9, wherein $R^{11}$ is an ortho alkyl substituted phenyl group.

12. The method of claim 11, wherein the ortho alkyl substituent is a methyl, ethyl, iso-propyl, propyl, butyl, or isobutyl group.

13. The method of claim 11, wherein the remaining positions of the phenyl group are hydrogen atoms or the 4 and 6 positions are substituted by an alkyl group.

14. The method of claim 1, wherein the scavenger is represented by the formula $((R_z\text{—Al—})_y\text{O—})_x$, wherein z is 2, y is 2, x is 1-100 and R is a C1-C12 hydrocarbyl group.

15. The method of claim 1, wherein the scavenger is present at from about 1 to about 5000 equivalents to 1 equivalent of pyridyldiamido transition metal catalyst.

16. The method of claim 1, wherein the polyolefin has a molecular weight of from about 1000 Da to about 3,000,000 Da.

17. The method of claim 1, wherein the scavenger has an oxygen to aluminum (O/Al) molar ratio from about 0.25 to about 1.5.

18. The method of claim 1, wherein the scavenger has an oxygen to aluminum (O/Al) molar ratio from about 0.5 and about 1.

19. The method of claim 1, wherein the pyridyldiamido transition metal catalyst is supported.

20. The method of claim 1, wherein the scavenger is bis (diisobutylaluminum) oxide.

21. The method of claim 1 further comprising chain transfer agent.

22. The method of claim 1 further comprising diethylzinc.

23. The method of claim 1, where two or more pyridyldiamido transition metal catalysts are combined with diethyl zinc in the same reactor with olefinic monomer or olefinic monomers.

24. The method of claim 1, where one or more pyridyldiamido transition metal catalysts are combined with another catalyst (such as a metallocene) and diethyl zinc in the same reactor with olefinic monomer or olefinic monomers.

25. The method of claim 1, where one or more pyridyldiamido transition metal catalysts are combined with metallocene catalyst and diethyl zinc in the same reactor with olefinic monomer or olefinic monomers.

26. A catalyst system comprising optionally an activator, dialkyl aluminum oxide scavenger and a pyridyldiamido transition metal complex represented by the formula (I) or (II):

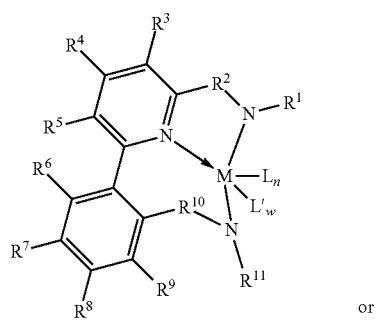

(I)

or

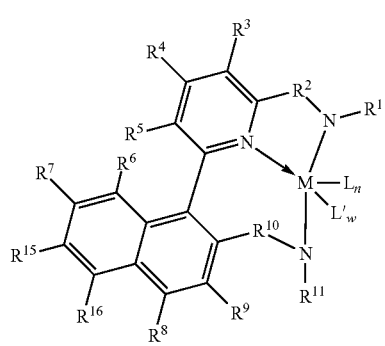

(II)

wherein:

M is a Group 3, 4, 5, 6, 7, 8, 9, 10, 11, or 12 metal;

$R^1$ and $R^{11}$ are each independently selected from the group consisting of hydrocarbyls, substituted hydrocarbyls, and silyl groups;

$R^2$ and $R^{10}$ are each, independently, $-E(R^{12})(R^{13})-$ with E being carbon, silicon, or germanium, and each $R^{12}$ and $R^{13}$ being independently selected from the group consisting of hydrogen, hydrocarbyls, substituted hydrocarbyls, alkoxy, silyl, amino, aryloxy, halogen, and phosphino, $R^{12}$ and $R^{13}$ may be joined to form a saturated, substituted or unsubstituted hydrocarbyl ring, where the ring has 4, 5, 6, or 7 ring carbon atoms and where substitutions on the ring can join to form additional rings, or $R^{12}$ and $R^{13}$ may be joined to form a saturated heterocyclic ring, or a saturated substituted heterocyclic ring where substitutions on the ring can join to form additional rings;

$R^3$, $R^4$, and $R^5$ are independently selected from the group consisting of hydrogen, hydrocarbyls, substituted hydrocarbyls, alkoxy, aryloxy, halogen, amino, and silyl, and wherein adjacent R groups ($R^3$ & $R^4$ and/or $R^4$ & $R^5$) may be joined to form a substituted or unsubstituted hydrocarbyl or heterocyclic ring, where the ring has 5, 6, 7, or 8 ring atoms and where substitutions on the ring can join to form additional rings;

$R^6$, $R^7$, $R^8$, $R^9$, $R^{15}$, and $R^{16}$ are independently selected from the group consisting of hydrogen, hydrocarbyls, substituted hydrocarbyls, alkoxy, halogen, amino, and silyl, and wherein adjacent R groups ($R^6$ & $R^7$, and/or $R^7$ & $R^{15}$, and/or $R^{16}$ & $R^{15}$, and/or $R^8$ & $R^9$) may be joined to form a saturated, substituted or unsubstituted hydrocarbyl or heterocyclic ring, where the ring has 5, 6, 7, or 8 ring carbon atoms and where substitutions on the ring can join to form additional rings;

L is an anionic leaving group, where the L groups may be the same or different and any two L groups may be linked to form a dianionic leaving group;

n is 0, 1, 2, 3, or 4;

L' is neutral Lewis base;

w is 0, 1, 2, 3, or 4; and wherein n+w is no greater than 4.

27. The catalyst system of claim 26, wherein the optional activator is a non-coordinating anion activator.

28. The catalyst system of claim 26, wherein the optional activator is alumoxane.

29. The catalyst system of claim 26, wherein $R^{11}$ is a phenyl group substituted at the 2 position with a C1-C20 alkyl group.

30. The catalyst system of claim 27, wherein $R^1$ is a phenyl group substituted at the 2 and 6 position with the same or different C1-C20 alkyl groups.

31. The catalyst system of claim 27, wherein the activator is one or more of:

trimethylammonium tetraphenylborate, triethylammonium tetraphenylborate, tripropylammonium tetraphenylborate, tri(n-butyl)ammonium tetraphenylborate, tri (t-butyl)ammonium tetraphenylborate, N,N-dimethylanilinium tetraphenylborate, N,N-diethylanilinium tetraphenylborate, N,N-dimethyl-(2,4, 6-trimethylanilinium)tetraphenylborate, tropillium tetraphenylborate, triphenylcarbenium tetraphenylborate, triphenylphosphonium tetraphenylborate triethylsilylium tetraphenylborate, benzene(diazonium)tetraphenylborate, trimethylammonium tetrakis (pentafluorophenyl)borate, triethylammonium tetrakis (pentafluorophenyl)borate, tripropylammonium tetrakis (pentafluorophenyl)borate, tri(n-butyl)ammonium tetrakis(pentafluorophenyl)borate, tri(sec-butyl)ammonium tetrakis(pentafluorophenyl)borate, N,N-dimethylanilinium tetrakis(pentafluorophenyl)borate, N,N-diethylanilinium tetrakis(pentafluorophenyl)borate, N,N-dimethyl-(2,4,6-trimethylanilinium)tetrakis (pentafluorophenyl)borate, tropillium tetrakis (pentafluorophenyl)borate, triphenylcarbenium tetrakis (pentafluorophenyl)borate, triphenylphosphonium tetrakis(pentafluorophenyl)borate, triethylsilylium tetrakis(pentafluorophenyl)borate, benzene(diazonium) tetrakis(pentafluorophenyl)borate, trimethylammonium tetrakis-(2,3,4,6-tetrafluorophenyl)borate, triethylammonium tetrakis-(2,3,4,6-tetrafluorophenyl)borate, tripropylammonium tetrakis-(2,3,4,6-tetrafluorophenyl)borate, tri(n-butyl)ammonium tetrakis-(2,3,4,6-tetrafluoro-phenyl)borate, dimethyl(t-butyl)ammonium tetrakis-(2,3,4,6-tetrafluorophenyl)borate, N,N-dimethylanilinium tetrakis-(2,3,4,6-tetrafluorophenyl)borate, N,N-diethylanilinium tetrakis-(2,3,4,6-tetrafluorophenyl)borate, N,N-dimethyl-(2,4,6-trimethylanilinium)tetrakis-(2,3,4,6-tetrafluorophenyl) borate, tropillium tetrakis-(2,3,4,6-tetrafluorophenyl) borate, triphenylcarbenium tetrakis-(2,3,4,6-tetrafluorophenyl)borate, triphenylphosphonium tetrakis-(2,3,4,6-tetrafluorophenyl)borate, triethylsilylium tetrakis-(2,3,4,6-tetrafluorophenyl)borate, benzene(diazonium)tetrakis-(2,3,4,6-tetrafluorophenyl)borate, trimethylammonium tetrakis(perfluoronaphthyl) borate, triethylammonium tetrakis(perfluoronaphthyl) borate, tripropylammonium tetrakis(perfluoronaphthyl) borate, tri(n-butyl)ammonium tetrakis (perfluoronaphthyl)borate, tri(t-butyl)ammonium tetrakis(perfluoronaphthyl)borate, N,N-dimethylanilinium tetrakis(perfluoronaphthyl)borate, N,N-diethylanilinium tetrakis(perfluoronaphthyl)borate, N,N-dimethyl-(2,4,6-trimethylanilinium)tetrakis (perfluoronaphthyl)borate, tropillium tetrakis (perfluoronaphthyl)borate, triphenylcarbenium tetrakis (perfluoronaphthyl)borate, triphenylphosphonium tetrakis(perfluoronaphthyl)borate, triethylsilylium tetrakis(perfluoronaphthyl)borate, benzene(diazonium) tetrakis(perfluoronaphthyl)borate, trimethylammonium tetrakis(perfluorobiphenyl)borate, triethylammonium tetrakis(perfluorobiphenyl)borate, tripropylammonium tetrakis(perfluorobiphenyl)borate, tri(n-butyl)ammonium tetrakis(perfluorobiphenyl)borate, tri(t-butyl)ammonium tetrakis(perfluorobiphenyl)borate, N,N-dimethylanilinium tetrakis(perfluorobiphenyl)borate, N,N-diethylanilinium tetrakis(perfluorobiphenyl)borate, N,N-dimethyl-(2,4,6-trimethylanilinium)tetrakis(perfluorobiphenyl)borate, tropillium tetrakis(perfluorobiphenyl)borate, triphenylcarbenium tetrakis(perfluorobiphenyl)borate, triphenylphosphonium tetrakis (perfluorobiphenyl)borate, triethylsilylium tetrakis (perfluorobiphenyl)borate, benzene(diazonium)tetrakis (perfluorobiphenyl)borate, trimethylammonium tetrakis(3,5-bis(trifluoromethyl)phenyl)borate, triethylammonium tetrakis(3,5-bis(trifluoromethyl)phenyl) borate, tripropylammonium tetrakis(3,5-bis(trifluoromethyl)phenyl)borate, tri(n-butyl)ammonium tetrakis(3,5-bis(trifluoromethyl)phenyl)borate, tri(t-butyl) ammonium tetrakis(3,5-bis(trifluoromethyl)phenyl) borate, N,N-dimethylanilinium tetrakis(3,5-bis(trifluoromethyl)phenyl)borate, N,N-diethylanilinium tetrakis(3,5-bis(trifluoromethyl)phenyl)borate, N,N-dimethyl-(2,4,6-trimethylanilinium)tetrakis(3,5-bis(trifluoromethyl)phenyl)borate, tropillium tetrakis(3,5-bis (trifluoromethyl)phenyl)borate, triphenylcarbenium tetrakis(3,5-bis(trifluoromethyl)phenyl)borate, triphenylphosphonium tetrakis(3,5-bis(trifluoromethyl)phenyl)borate, triethylsilylium tetrakis(3,5-bis(trifluoromethyl)phenyl)borate, benzene(diazonium)tetrakis(3,5-bis(trifluoromethyl)phenyl)borate, di-(i-propyl) ammonium tetrakis(pentafluorophenyl)borate, dicyclohexylammonium tetrakis(pentafluorophenyl) borate; tri(o-tolyl)phosphonium tetrakis(pentafluorophenyl)borate, tri(2,6-dimethylphenyl)phosphonium tetrakis(pentafluorophenyl)borate, trimethylammonium tetrakis(perfluoronaphthyl)borate, triethylammonium tetrakis(perfluoronaphthyl)borate, tripropylammonium tetrakis(perfluoronaphthyl)borate.

32. The catalyst system of claim 27, wherein the activator is one or more of:

tri(n-butyl)ammonium tetrakis(perfluoronaphthyl)borate, tri(t-butyl)ammonium tetrakis(perfluoronaphthyl)borate, N,N-dimethylanilinium tetrakis(perfluoronaphthyl)borate, N,N-diethylanilinium tetrakis(perfluoronaphthyl)borate, N,N-dimethyl-(2,4,6-trimethylanilinium)tetrakis(perfluoronaphthyl)borate, tropillium tetrakis(perfluoronaphthyl)borate, triphenylcarbenium tetrakis(perfluoronaphthyl)borate, triphenylphosphonium tetrakis(perfluoronaphthyl)borate, triethylsilylium tetrakis(perfluoronaphthyl)borate, benzene(diazonium)tetrakis(perfluoronaphthyl)borate, trimethylammonium tetrakis(perfluorobiphenyl)borate, triethylammonium tetrakis(perfluorobiphenyl)borate, tripropylammonium tetrakis(perfluorobiphenyl)borate, tri(n-butyl)ammonium tetrakis(perfluorobiphenyl)borate, tri(t-butyl)ammonium tetrakis(perfluorobiphenyl) borate, N,N-dimethylanilinium tetrakis(perfluorobiphenyl)borate, N,N-diethylanilinium tetrakis (perfluorobiphenyl)borate, N,N-dimethyl-(2,4,6-trimethylanilinium)tetrakis(perfluorobiphenyl)borate, tropillium tetrakis(perfluorobiphenyl)borate, triphenylcarbenium tetrakis(perfluorobiphenyl)borate, triphenylphosphonium tetrakis(perfluorobiphenyl)borate, triethylsilylium tetrakis(perfluorobiphenyl)borate, benzene(diazonium)tetrakis(perfluorobiphenyl)borate, and [4-t-butyl-PhNMe$_2$H][(C$_6$F$_3$(C$_6$F$_5$)$_2$)$_4$B], (where Ph is phenyl and Me is methyl).

33. A catalyst system comprising an activator, dialkylaluminum oxide scavenger and a pyridyldiamido transition metal complex represented by the formula (I) or (II):

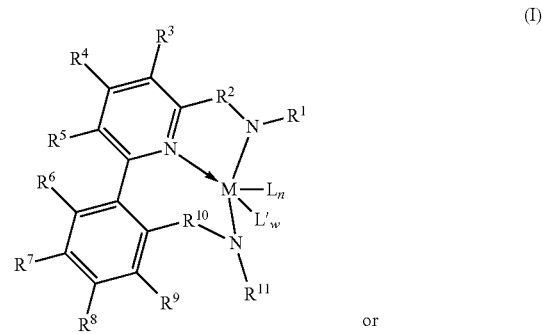

(I)

or

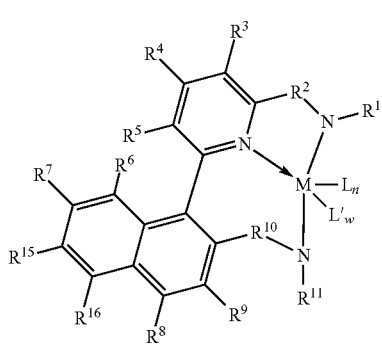

(II)

wherein:
M is a Group 3, 4, 5, 6, 7, 8, 9, 10, 11, or 12 metal;
$R^1$ is selected from the group consisting of hydrocarbyls, substituted hydrocarbyls, and silyl groups;
$R^{11}$ is a phenyl group substituted at the 2 position and which is not substituted at the 3, 5, and/or 6 positions provided that the 4 position can be substituted with a group 17 element or a C1-C20 alkyl group;
$R^2$ and $R^{10}$ are each, independently, -E($R^{12}$)($R^{13}$)— with E being carbon, silicon, or germanium, and each $R^{12}$ and $R^{13}$ being independently selected from the group consisting of hydrogen, hydrocarbyls, substituted hydrocarbyls, alkoxy, silyl, amino, aryloxy, halogen, and phosphino, $R^{12}$ and $R^{13}$ may be joined to form a saturated, substituted or unsubstituted hydrocarbyl ring, where the ring has 4, 5, 6, or 7 ring carbon atoms and where substitutions on the ring can join to form additional rings, or $R^{12}$ and $R^{13}$ may be joined to form a saturated heterocyclic ring, or a saturated substituted heterocyclic ring where substitutions on the ring can join to form additional rings;
$R^3$, $R^4$, and $R^5$ are independently selected from the group consisting of hydrogen, hydrocarbyls, substituted hydrocarbyls, alkoxy, aryloxy, halogen, amino, and silyl, and wherein adjacent R groups ($R^3$ & $R^4$ and/or $R^4$ & $R^5$) may be joined to form a substituted or unsubstituted hydrocarbyl or heterocyclic ring, where the ring has 5, 6, 7, or 8 ring atoms and where substitutions on the ring can join to form additional rings;
$R^6$, $R^7$, $R^8$, $R^9$, $R^{15}$, and $R^{16}$ are independently selected from the group consisting of hydrogen, hydrocarbyls, substituted hydrocarbyls, alkoxy, halogen, amino, and silyl, and wherein adjacent R groups ($R^6$ & $R^7$, and/or $R^7$ & $R^{15}$, and/or $R^{16}$ & $R^{15}$, and/or $R^8$ & $R^9$) may be joined to form a saturated, substituted or unsubstituted hydrocarbyl or heterocyclic ring, where the ring has 5, 6, 7, or 8 ring carbon atoms and where substitutions on the ring can join to form additional rings;
L is an anionic leaving group, where the L groups may be the same or different and any two L groups may be linked to form a dianionic leaving group;
n is 0, 1, 2, 3, or 4;
L' is neutral Lewis base;
w is 0, 1, 2, 3, or 4; and
wherein n+w is no greater than 4.

34. The catalyst system of claim 33, wherein M is Ti, Zr, or Hf;
$R^6$, $R^7$, $R^8$, $R^9$, $R^{15}$, and $R^{16}$, are independently selected from the group consisting of hydrogen, hydrocarbyls, substituted hydrocarbyls, alkoxy, halogen, amino, and silyl;
each L is independently selected from the group consisting of halide, alkyl, aryl, alkoxy, amido, hydrido, phenoxy, hydroxy, silyl, allyl, alkenyl, and alkynyl;
each L' is independently selected from the group consisting of ethers, thio-ethers, amines, nitriles, imines, pyridines, and phosphines;
the $R^2$ group(s) are selected from the group consisting of $CH_2$, $CMe_2$, $SiMe_2$, $SiEt_2$, $SiPr_2$, $SiBu_2$, $SiPh_2$, $Si(aryl)_2$, and $Si(alkyl)_2$, CH(aryl), CH(Ph), CH(alkyl), CH(2-isopropylphenyl), where alkyl is a $C_1$ to $C_{40}$ alkyl group, and aryl is a $C_5$ to $C_{40}$ aryl group; and/or
the $R^{10}$ group(s) are selected from the group consisting of $CH_2$, $CMe_2$, $SiMe_2$, $SiEt_2$, $SiPr_2$, $SiBu_2$, $SiPh_2$, $Si(aryl)_2$, and $Si(alkyl)_2$, CH(aryl), CH(Ph), CH(alkyl), CH(2-isopropylphenyl), where alkyl is a $C_1$ to $C_{40}$ alkyl group, aryl is a $C_5$ to $C_{40}$ aryl group, and Ph is phenyl.

35. The catalyst system of claim 33, wherein $R^{11}$ is an ortho alkyl substituted phenyl group.

36. The catalyst system of claim 35, wherein the ortho alkyl substituent is a methyl, ethyl, iso-propyl, propyl, butyl, or isobutyl group.

37. The catalyst system of claim 35, wherein the remaining positions of the phenyl group are hydrogen atoms or the 4 position is substituted by a halogen or a C1-C20 alkyl group.

38. The catalyst system of claim 33, where $R^1$ is a phenyl group substituted at the 2 and 6 positions.

39. The catalyst system of claim 33, where $R^1$ is a phenyl group substituted at the 2 and 6 positions with the same or different C1-C20 alkyl groups.

40. The catalyst system of claim 33, where $R^{11}$ is a phenyl group which is substituted at the 2 position with a C1-C20 alkyl group and which is not substituted at the 3, 5, and/or 6 positions, provided that the 4 position can be substituted with a group 17 element or a C1-C20 alkyl group.

41. The catalyst system of claim 40, where $R^1$ is a phenyl group substituted at the 2 and 6 positions with the same or different C1-C20 alkyl groups.

42. The catalyst system of claim 33, wherein the scavenger is represented by the formula $((R_z\text{—Al—})_y O\text{—})_x$, wherein z is 2, y is 2, x is 1-100 and R is a C1-C12 hydrocarbyl group.

43. The catalyst system of claim 33, wherein the scavenger is represented by the formula $((R_z\text{—Al—})_y O\text{—})_x$, wherein z is 2, y is 2, x is 1-100 and R is a C1-C12 hydrocarbyl group; $R^{11}$ is a phenyl group which is substituted at the 2 position with a C1-C20 alkyl group and which is not substituted at the 3, 5, and/or 6 positions, provided that the 4 position can be substituted with a group 17 element or a C1-C20 alkyl group; and $R^1$ is a phenyl group substituted at the 2 and 6 positions with the same or different C1-C20 alkyl groups.

* * * * *